US012276938B2

(12) United States Patent
Inoue et al.

(10) Patent No.: US 12,276,938 B2
(45) Date of Patent: Apr. 15, 2025

(54) TONER

(71) Applicant: CANON KABUSHIKI KAISHA, Tokyo (JP)

(72) Inventors: Mayumi Inoue, Shizuoka (JP); Takashi Kenmoku, Shizuoka (JP); Yoshiaki Shiotari, Shizuoka (JP); Shohei Kototani, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 542 days.

(21) Appl. No.: 17/806,850

(22) Filed: Jun. 14, 2022

(65) Prior Publication Data

US 2022/0413407 A1 Dec. 29, 2022

(30) Foreign Application Priority Data

Jun. 21, 2021 (JP) ................................. 2021-102554
May 11, 2022 (JP) ................................. 2022-078276

(51) Int. Cl.
*G03G 9/093* (2006.01)
*G03G 9/08* (2006.01)
*G03G 9/087* (2006.01)

(52) U.S. Cl.
CPC ....... *G03G 9/09321* (2013.01); *G03G 9/0819* (2013.01); *G03G 9/08711* (2013.01); *G03G 9/08722* (2013.01); *G03G 9/09342* (2013.01)

(58) Field of Classification Search
CPC ........... G03G 9/09321; G03G 9/09342; G03G 9/08791; G03G 9/08773; G03G 9/09328
See application file for complete search history.

(56) References Cited

U.S. PATENT DOCUMENTS 4,954,404 A 9/1990 Inoue
5,620,783 A 4/1997 Takeuchi
5,639,583 A 6/1997 Takeuchi
5,776,543 A 7/1998 Takeuchi
6,777,153 B2 8/2004 Yano
6,808,907 B2 10/2004 Honma
6,908,721 B2 6/2005 Kenmoku
6,911,520 B2 6/2005 Fukui
7,045,321 B2 5/2006 Imamura
7,393,912 B2 7/2008 Mihara
7,399,568 B2 7/2008 Fukui
7,408,017 B2 8/2008 Imamura
7,452,960 B2 11/2008 Yano
7,510,813 B2 3/2009 Yano
7,638,194 B2 12/2009 Fukui
7,638,590 B2 12/2009 Fukui
7,682,765 B2 3/2010 Sugawa
7,795,363 B2 9/2010 Fukui
7,935,771 B2 5/2011 Fukui
8,067,136 B2 11/2011 Yano
8,093,342 B2 1/2012 Minami
8,110,329 B2 2/2012 Tominaga
8,178,271 B2 5/2012 Fukui
8,288,069 B2 10/2012 Fujikawa
8,323,726 B2 12/2012 Naka
8,383,312 B2 2/2013 Fujimoto
8,574,801 B2 11/2013 Itabashi
8,609,312 B2 12/2013 Itabashi
8,828,633 B2 9/2014 Itabashi
(Continued)

FOREIGN PATENT DOCUMENTS

JP 2014-130238 A 7/2014
JP 5601104 B2 * 10/2014
(Continued)

*Primary Examiner* — Peter L Vajda
*Assistant Examiner* — Jenna Kuipers
(74) *Attorney, Agent, or Firm* — VENABLE LLP

(57) ABSTRACT

A toner, comprising a toner particle, wherein the toner particle has a core-shell structure comprising a core particle and a shell on a surface of the core particle, the shell comprises a polymer having monomer units represented by Formula (I) below, the toner comprises a specific external additive A, the external additive A is at least one selected from the group consisting of silica fine particles and organosilicon polymer fine particles, and a ratio of coverage of a surface of the toner particle with the external additive A is 0.3 area % or higher:

(I)

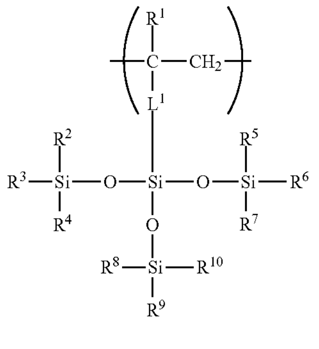

in Formula (I), $L^1$ represents $—COO(CH_2)_n—$ (where n is an integer of 1 to 10), and carbonyl of $L^1$ is bonded to a carbon atom of a main chain; $R^1$ represents hydrogen or a methyl group; and $R^2$ to $R^{10}$ represent each independently an alkyl group having 1 to 4 carbon atoms.

7 Claims, No Drawings

(56) References Cited

U.S. PATENT DOCUMENTS

| | | | |
|---|---|---|---|
| 8,986,914 | B2 | 3/2015 | Fujikawa |
| 9,029,056 | B2 | 5/2015 | Kenmoku |
| 9,034,549 | B2 | 5/2015 | Shiotari |
| 9,098,002 | B2 | 8/2015 | Kenmoku |
| 9,098,003 | B2 | 8/2015 | Masumoto |
| 9,256,148 | B2 | 2/2016 | Fujikawa |
| 9,261,806 | B2 | 2/2016 | Moribe |
| 9,285,697 | B2 | 3/2016 | Fukudome |
| 9,423,714 | B2 | 8/2016 | Kenmoku |
| 9,594,323 | B2 | 3/2017 | Fujikawa |
| 10,114,303 | B2 | 10/2018 | Katsura |
| 10,678,155 | B2 | 6/2020 | Terui |
| 10,747,133 | B2 | 8/2020 | Yagi |
| 10,747,136 | B2 | 8/2020 | Kenmoku |
| 10,942,465 | B2 | 3/2021 | Kototani |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,104 | B2 | 5/2021 | Katsura |
| 11,003,105 | B2 | 5/2021 | Sato |
| 11,169,458 | B2 | 11/2021 | Toyoizumi |
| 11,169,460 | B2 | 11/2021 | Kototani |
| 11,175,600 | B2 | 11/2021 | Uchiyama |
| 11,256,187 | B2 | 2/2022 | Ogaki |
| 11,314,178 | B2 | 4/2022 | Kenmoku |
| 11,347,157 | B2 | 5/2022 | Kamikura |
| 11,397,386 | B2 | 7/2022 | Kyuushima |
| 2005/0260514 | A1 | 11/2005 | Mihara |
| 2006/0194071 | A1 | 8/2006 | Yano |
| 2012/0172562 | A1 | 7/2012 | Kenmoku |
| 2013/0065174 | A1 | 3/2013 | Itabashi |
| 2014/0186761 | A1 | 7/2014 | Abe |
| 2021/0026265 | A1 | 1/2021 | Kamikura |
| 2021/0311405 | A1 | 10/2021 | Shiotari |
| 2021/0405549 | A1 | 12/2021 | Ookubo |
| 2022/0075284 | A1 | 3/2022 | Nakayama |
| 2022/0128916 | A1 | 4/2022 | Yoshida |
| 2022/0128918 | A1 | 4/2022 | Kototani |
| 2022/0146954 | A1 | 5/2022 | Kato |
| 2022/0214629 | A1 | 7/2022 | Kenmoku |

FOREIGN PATENT DOCUMENTS

| | | | | |
|---|---|---|---|---|
| JP | 2017-32598 | A | | 2/2017 |
| JP | 2017-134367 | A | | 8/2017 |
| JP | 6463154 | B2 | * | 1/2019 |

* cited by examiner

TONER

BACKGROUND OF THE INVENTION

Field of the Invention

The present disclosure relates to a toner used in a recording method that relies on for instance an electrophotographic method.

Description of the Related Art

The further development of computers and multimedia in recent years has been accompanied by changing user needs for image forming apparatuses such as copiers and printers; also, yet higher performance has come to be demanded in terms of longer life, smaller sizes and higher speeds. For instance in office applications, which involve large amounts of prints, output image quality is required to not fluctuate, regardless of image output counts. To meet such demands it is necessary to further enhance the performance of the toner also in terms of durability.

In Japanese Patent Application Publication No. 2017-032598 an external additive is used that has a large particle diameter, as a technique for increasing the durability of a toner.

Further, Japanese Patent Application Publication No. 2014-130238 discloses a toner having a surface layer that contains an organosilicon polymer as a toner having excellent storage stability, environmental stability and development durability.

Japanese Patent Application Publication No. 2017-134367 discloses a method for producing a toner, the surface of which is covered with two or more types of silicon compound.

SUMMARY OF THE INVENTION

However, when durability is improved through addition of a substantial amount of a large-particle-diameter external additive, as in Japanese Patent Application Publication No. 2017-032598, it is difficult to cause the large-particle-diameter external additive to adhere to the toner particle surface, given that physical/electrostatic forces onto the toner particle surface are weak due to the size of the large-particle-diameter external additive. The large-particle-diameter external additive that has failed to adhere gives rise to member contamination on the charging member and on the photosensitive drum, which translates into image defects (vertical streaks in solid images).

Although a method such as that of Japanese Patent Application Publication No. 2014-130238 is an effective means against a phenomenon (bleeding) in which a toner release agent or resin component exudes from the interior of the toner onto the surface, it is nevertheless necessary to improve on member contamination derived from long-term durability in a case where an external additive is utilized. Toners produced in accordance with a method such as Japanese Patent Application Publication No. 2017-134367 exhibit excellent charge stability even in high-temperature, high-humidity environments, but necessitate improvements in member contamination derived from long-term durability use, in a case where an external additive is utilized.

It is an object of the present disclosure to provide a toner exhibiting improved image streaks and member contamination and in which migration of external additive onto a member is suppressed, even after long-term use, while satisfying low-temperature fixability.

The present disclosure relates to a toner, comprising a toner particle, wherein

- the toner particle has a core-shell structure comprising a core particle and a shell on a surface of the core particle,
- the shell comprises a polymer having monomer units represented by Formula (I) below,
- the toner comprises an external additive A having a particle diameter of 30 to 300 nm,
- the external additive A is at least one selected from the group consisting of silica fine particles and organosilicon polymer fine particles, and
- a ratio of coverage of a surface of the toner particle with the external additive A is 0.3 area % or higher:

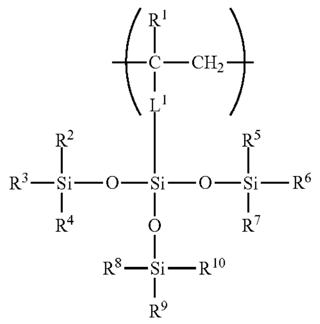

(I)

in Formula (I), $L^1$ represents $—COO(CH_2)_n—$ (where n is an integer of 1 to 10), and carbonyl of $L^1$ is bonded to a carbon atom of a main chain; $R^1$ represents hydrogen or a methyl group; and $R^2$ to $R^{10}$ represent each independently an alkyl group having 1 to 4 carbon atoms.

The present disclosure allows providing a toner which exhibits improved image streaks and member contamination, and in which migration of an external additive onto a member is suppressed, even after long-term use, while satisfying low-temperature fixability. Further features of the present invention will become apparent from the following description of exemplary embodiments.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. Further, the term monomer unit refers to a form resulting from reaction of a monomer substance in a polymer.

The present disclosure relates to a toner, comprising a toner particle, wherein

- the toner particle has a core-shell structure comprising a core particle and a shell on a surface of the core particle,
- the shell comprises a polymer having monomer units represented by Formula (I) below,
- the toner comprises an external additive A having a particle diameter of 30 to 300 nm, the external additive A is at least one selected from the group consisting of silica fine particles and organosilicon polymer fine particles, and a ratio of coverage of a surface of the toner particle with the external additive A is 0.3 area % or higher:

(I)

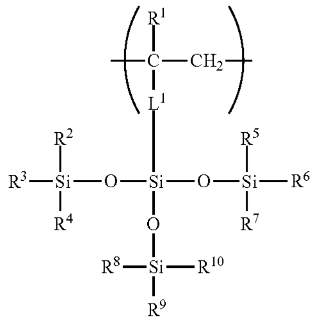

in Formula (I), $L^1$ represents $-COO(CH_2)_n-$ (where n is an integer of 1 to 10), and carbonyl of $L^1$ is bonded to a carbon atom of a main chain; $R^1$ represents hydrogen or a methyl group; and $R^2$ to $R^{10}$ represent each independently an alkyl group having 1 to 4 carbon atoms.

The inventors found that, thanks to the above toner, a toner can be provided in which migration of an external additive to a member is suppressed, even over long periods of time, and in which image streaks and member contamination are improved upon. The inventors surmise the following concerning the underlying reasons for this. The inventors speculated that migration of the external additive onto a member can be suppressed by increasing and the affinity between the toner particle surface and the external additive, and by further increasing contact frequency/contact area therebetween.

In the case of the above configuration, a siloxane structure is present in the monomer units represented by Formula (I) and included in the polymer contained in a shell of the toner particle. Therefore, the affinity between the monomer units represented by Formula (I) and the external additive having a siloxane bond is high, and the toner particle and the external additive readily adhere to each other.

Further, the monomer units represented by Formula (I) have a flexible molecular structure, and contain an alkylene group and trimethylsilyl groups, which do not give rise to a condensation reaction. As a result, the contact area between the siloxane structure in the monomer units represented by Formula (I) and the external additive increases, which allows suppressing migration of the external additive to the member.

Further, the C═O moiety and the Si—O moiety of the monomer units represented by Formula (I) are linked by an alkylene group having from 1 to 10 carbon atoms. In such a structure, the polarized C═O moiety and Si—O moiety lie in a range where the foregoing are mutually acted upon by electrostatic interactions, so that charge is transferred therebetween. As a result, the electrostatic attraction acting between the toner particle and the external additive becomes larger, and detachment of the external additive from the toner particle surface can be suppressed. This allows suppressing image streaks even after long-term use.

Further, the monomer units represented by Formula (I) contain trimethylsilyl groups and have a structure in which condensation reactions between the monomer units do not occur; it is deemed that, as a result, the shell does not harden readily, and low-temperature fixability is not readily impaired.

The toner comprises an external additive A having a large particle diameter of 30 nm to 300 nm. A ratio of coverage of a surface of the toner particle with the external additive A is controlled to be 0.3 area % or higher. Sufficient flowability can be imparted as a result to the toner. The ratio of coverage (hereinafter, it is also called coverage ratio) of the surface of the toner particle with the external additive A is preferably 20.0 area % or lower, and is more preferably from 1.5 area % to 10.0 area %. Because the amount of external additive A that fails to become fixed to the toner particle is reduced in a case where the coverage ratio is 20.0 area % or lower, it becomes possible to suppress an occurrence of adverse effects such as initial image streaks and image fogging. The coverage ratio of the external additive A on the toner particle surface can be controlled on the basis of the particle diameter and the addition amount of the external additive A.

The external additive A is a particle having a particle diameter from 30 nm to 300 nm. When the particle diameter is 30 nm or larger, electrostatic aggregation of the external additive is not prone to occur, and image adverse effects derived from defective regulation can be avoided. In a case where the external additive on the toner surface becomes electrostatically aggregated, the coverage ratio of the external additive decreases and the flowability of the toner drops, and image adverse effects derived from defective regulation occur as a result. Defective regulation is a phenomenon in which the carrying capacity of toner on a developing roller cannot be sufficiently regulated by a toner regulating member, and an unsuccessfully regulated toner coating becomes uneven on the developing roller, which results in image adverse effects in the form of image unevenness.

In a case where the particle diameter of the external additive A is larger than 300 nm, the external additive A is less likely to dwell stably on the toner particle surface, and may give rise to member contamination. Preferably, the calculated number-average particle diameter of particles recognized as the external additive A is from 50 nm to 200 nm.

The features of the toner will be explained in detail hereafter, but the present invention is not limited to these features.

Shell

The toner particle has a core-shell structure comprising a core particle and a shell on a surface of the core particle. The shell need not necessarily cover the entire core particle, and a portion may remain at which the core particle is exposed. The shell has a polymer containing monomer units represented by Formula (I). Preferably, the shell is made up of a polymer containing monomer units represented by Formula (I). The content ratio of the polymer containing monomer units represented by Formula (I) in the shell is preferably 50 mass % to 100 mass %, more preferably 75 mass % to 100 mass %, and yet more preferably 90 mass % to 100 mass %.

In Formula (I), $L^1$ represents $-COO(CH_2)_n-$ (where n is an integer of 1 to 10), and the carbonyl in $L^1$ is bonded to a carbon atom of the main chain. Further, $R^1$ represents hydrogen or a methyl group. Further, $R^2$ to $R^{10}$ represent each independently an alkyl group having 1 to 4 (preferably having 1 to 3, more preferably 1 or 2, and yet more preferably 1) carbon atoms. In a case where the polymer contains multiple different monomer units of Formula (I), then n, $R^1$ and $R^2$ to $R^{10}$ in the respective monomer units may be identical or may be dissimilar.

Further, n in Formula (I) is preferably 1 to 8, more preferably 1 to 5, and yet more preferably 1 to 3. When n is 1 to 5, the distance between the polarized CO═O moiety and Si—O moiety in Formula (I) decreases, and transfer of charge occurs readily as a result.

The polymer contained in the shell may be made up of the monomer units represented by Formula (I) alone, or may be a copolymer of the monomer units represented by Formula (I) and one or more types of other monomer units. The polymerizable monomer used for copolymerization can be set as appropriate depending on the toner particle that is to be produced; for instance a vinylic polymerizable monomer that allows for radical polymerization can be used herein. A monofunctional polymerizable monomer or a polyfunctional polymerizable monomer can be used as the vinylic polymerizable monomer.

Examples of monofunctional polymerizable monomers include the following.

styrene; styrene derivatives such as α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxystyrene and p-phenyl styrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethylphosphate ethyl acrylate, diethylphosphate ethyl acrylate, dibutylphosphate ethyl acrylate and 2-benzoyl oxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethylphosphate ethyl methacrylate and dibutylphosphate ethyl methacrylate; methylene aliphatic monocarboxylic acid esters; vinyl esters such as vinyl acetate, vinyl propionate, vinyl butyrate, vinyl benzoate and vinyl formate; vinyl ethers such as vinyl methyl ether, vinyl ethyl ether and vinyl isobutyl ether; and vinyl ketones such as vinyl methyl ketone, vinyl hexyl ketone and vinyl isopropyl ketone.

Examples of polyfunctional polymerizable monomers include the following.

For instance diethylene glycol diacrylate, triethylene glycol diacrylate, tetraethylene glycol diacrylate, polyethylene glycol diacrylate, 1,6-hexanediol diacrylate, neopentylglycol diacrylate, tripropylene glycol diacrylate, polypropylene glycol diacrylate, 2,2'-bis(4-(acryloxy diethoxy)phenyl)propane, trimethylolpropane triacrylate, tetramethylol methanetetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentylglycol dimethacrylate, polypropylene glycol dimethacrylate, 2,2'-bis(4-(methacryloxy diethoxy)phenyl)propane, 2,2'-bis(4-(methacryloxy polyethoxy)phenyl)propane, trimethylolpropane trimethacrylate, tetramethylol methane tetramethacrylate, divinylbenzene, divinylnaphthalene and divinyl ether.

The content ratio of the monomer units represented by Formula (I) in the polymer having the monomer units represented by Formula (I) is preferably 50 mass % or higher. When the content ratio of the monomer units represented by Formula (I) is 50 mass % or higher, the proportion of the monomer units present at the contact interface between the toner particle and the external additive A increases, and the contact area with the external additive A likewise increases, as a result of which the effect derived from the above-described mechanism can be readily brought out. The content ratio is more preferably 70 mass % to 100 mass %, yet more preferably 90 mass % to 100 mass %.

Preferably, a ratio of coverage of the surface of the core particle with the shell is 80 area % or higher, in a backscattered electron image of the toner particle captured at 10,000 magnifications using a scanning electron microscope. In a case where the coverage ratio of the surface of the core particle by the shell is 80 area % or higher, the proportion of the shell present on the surface of the core particle is high, and the contact probability with the external additive A increases, thanks to which the effect elicited by the above mechanism is readily brought out. The method for calculating the coverage ratio of the core particle surface by the shell will be described further on. The coverage ratio is more preferably 85 area % or higher, yet more preferably 90 area % or higher. The upper limit is not particularly restricted, but is preferably 100 area % or lower, and more preferably 97 area % or lower. The coverage ratio can be controlled on the basis of the particle diameter and the addition amount of the external additive A.

The content of the shell is preferably from 0.10 parts by mass to 4.00 parts by mass, more preferably from 0.30 parts by mass to 2.00 parts by mass, relative to 100 parts by mass of the core particle. When the content is 0.10 parts by mass or larger, the amount of the monomer units represented by Formula (I) contained in the shell is appropriate, thanks to which the above effect is elicited more readily. When the content is 4.00 parts by mass or less, fixation is unlikelier to be hindered.

In the toner, the polymer containing monomer units represented by Formula (I) is included in the shell that is contained in the toner particle. This can be ascertained through structural analysis of the shell by $^1$H-NMR. The detailed procedure will be described further on.

External Additive A

The external additive A will be explained next. The external additive A is particles having a particle diameter of 30 nm to 300 nm. The external additive A is at least one selected from the group consisting of silica fine particles and organosilicon polymer fine particles. The external additive A preferably comprises silica fine particles. Preferably, the external additive A comprises silica fine particles and organosilicon polymer fine particles. The shape of the particles is preferably spherical, and a ratio of major axis/minor axis is preferably 1.3 or lower.

The external additive A is not particularly limited provided that the above conditions are satisfied, and examples of the external additive A of the particles that can be used include sol-gel silica fine particles, fused silica fine particles and organosilicon polymer fine particles, as well as combinations of the foregoing. These particles may be surface-treated with for instance a silane coupling agent, a titanium coupling agent or silicone oil.

Concrete examples of the organosilicon polymer fine particles include fine particles of an organosilicon polymer having siloxane bonds as a main chain. The organosilicon polymer is formed by at least one selected from the group consisting of the structural units represented by Formulae (1) to (4) below. In the formulas, $R^{11}$ to $R^{16}$ are each for instance an alkyl group having 1 to 6 carbon atoms, or a phenyl group.

(1)

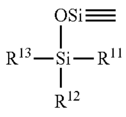

(2)

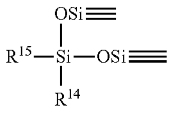

(3)

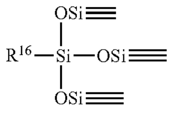

(4)

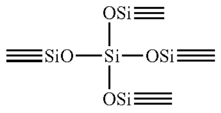

In a case where the organosilicon polymer includes a large amount of the structure of Formula (3) (hereafter also referred to as "T3 unit structure"), the organosilicon polymer, while functioning as an external additive, allows achieving well-balanced elasticity in which pressure can be effectively dispersed through appropriate deformation even when the organosilicon polymer is acted upon by embedded pressure. That is, particles are obtained that do not become readily embedded into the toner particle, but which do impart flowability at the same time.

Specifically, the proportion of the surface area of peaks derived from silicon having a T3 unit structure, relative to the total surface area of the peaks derived from all silicon contained in the organosilicon polymer fine particles in a $^{29}$Si-NMR measurement, is preferably from 0.70 to 1.00. More preferably, the above proportion is from 0.90 to 1.00. Herein $R^{16}$ is not particularly limited, but migration of the organosilicon polymer fine particles from the toner particle can be suitably suppressed in a case where $R^{16}$ is an alkyl group or a phenyl group having 1 to 6 (preferably 1 or 2, more preferably 1) carbon atoms.

The method for producing the organosilicon polymer fine particles is not particularly limited, and may involve for instance adding dropwise a silane compound that is then hydrolyzed and subjected to a condensation reaction, using a catalyst, followed by filtration and drying of the obtained suspension. The particle diameter can be controlled for instance on the basis of the type of catalyst, the compounding ratio, the reaction start temperature, and the dropwise addition time.

Examples of the catalyst include, although not limited thereto, acidic catalysts such as hydrochloric acid, hydrofluoric acid, sulfuric acid and nitric acid, and basic catalysts such as aqueous ammonia, sodium hydroxide and potassium hydroxide.

An organosilicon compound for producing the organosilicon polymer fine particles will be explained next.

The organosilicon polymer is preferably a condensate of an organosilicon compound having a structure represented by Formula (Z) below.

(Z)

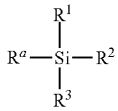

In Formula (Z), $R^a$ represents an organic functional group; and. $R^1$, $R^2$, and $R^3$ represent each independently a halogen atom, a hydroxy group an acetoxy group or an alkoxy group (preferably having from 1 to 3 carbon atoms)

Further, $R^a$ is an organic functional group that is not particularly limited, but as a preferred example is a hydrocarbon group (preferably an alkyl group) having from 1 to 6 (preferably 1 to 3, and more preferably 1 or 2) carbon atoms, or is an aryl group (preferably a phenyl group).

Further, $R^1$, $R^2$ and $R^3$ are each independently a halogen atom, a hydroxy group, an acetoxy group or an alkoxy group. The foregoing are reactive groups and form crosslinked structures through hydrolysis, addition polymerization and condensation. The hydrolysis, addition polymerization and condensation of $R^1$, $R^2$ and $R^3$ can be controlled on the basis of the reaction temperature, reaction time, reaction solvent and pH. An organosilicon compound having three reactive groups ($R^1$, $R^2$ and $R^3$) in the molecule, excluding $R^a$, as in the Formula (Z), is also referred to as a trifunctional silane.

Examples of Formula (Z) include the following.

Trifunctional methylsilanes such as p-styryltrimethoxysilane, methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane and methyldiethoxyhydroxysilane; trifunctional ethylsilanes such as ethyltrimethoxysilane, ethyltriethoxysilane, ethyltrichlorosilane, ethyltriacetoxysilane and ethyltrihydroxysilane; trifunctional propylsilanes such as propyltrimethoxysilane, propyltriethoxysilane, propyltrichlorosilane, propyltriacetoxysilane and propyltrihydroxysilane; trifunctional butylsilanes such as butyltrimethoxysilane, butyltriethoxysilane, butyltrichlorosilane, butyltriacetoxysilane and butyltrihydroxysilane; trifunctional hexylsilanes such as hexyltrimethoxysilane, hexyltriethoxysilane, hexyltrichlorosilane, hexyltriacetoxysilane and hexyltrihydroxysilane; and trifunctional phenylsilanes such as phenyltrimethoxysilane, phenyltriethoxysilane, phenyltrichlorosilane, phenyltriacetoxysilane and phenyltrihydroxysilane. The organosilicon compound may be used singly or in combinations of two or more types.

Further, the following may be used in combination with the organosilicon compound having the structure represented by the Formula (Z). Organosilicon compounds having four reactive groups in the molecule (tetrafunctional silanes), organosilicon compounds having two reactive groups in the molecule (bifunctional silanes), and organosilicon compounds having one reactive group (monofunctional silanes). Examples include for instance the following.

Trifunctional vinylsilanes such as dimethyldiethoxysilane, tetraethoxysilane, hexamethyldisilazane, 3-aminopropyltrimethoxysilane, 3-aminopropyltrimethoxysilane, 3-(2-aminoethyl)aminopropyltrimethoxysilane, 3-(2-aminoethyl) aminopropyltriethoxysilane, vinyltriisocyanate silane, vinyltrimethoxysilane, vinyltriethoxysilane, vinyldiethoxymethoxysilane, vinylethoxydimethoxysilane, vinylethoxydihydroxysilane, vinyldimethoxyhydroxysilane, vinylethoxymethoxyhydroxysilane and vinyldiethoxyhydroxysilane.

The content of the structure represented by the Formula (Z) in the monomer that forms the organosilicon polymer is preferably 50 mol % or higher, and more preferably 60 mol % or higher.

As the case may require, fine particles other than the external additive A can be used concomitantly in the toner, as an external additive, provided that the above effects are not impaired. This allows controlling for instance flowability, charging performance and cleaning performance.

Examples of the external additive include silica fine particles and other inorganic oxide fine particles made up of alumina fine particles or titanium oxide fine particles, inorganic stearic acid compound fine particles such as aluminum stearate fine particles and zinc stearate fine particles, and inorganic titanium acid compound fine particles such as strontium titanate and zinc titanate.

The silica fine particles include for instance dry-method silica fine particles, so-called dry silica fine particles or fumed silica, produced by vapor phase oxidation of a silicon halide, as well as so-called wet silica fine particles produced from waterglass or the like.

As the dry silica fine particles there can be obtained composite fine particles of silica and other metal oxides by using other metal halide compounds such as aluminum chloride or titanium chloride in the production process, together with the silicon halide.

Preferably, these inorganic fine particles are surface-treated for instance with a silane coupling agent, a titanium coupling agent, a higher fatty acid, silicone oil, a silicone varnish, or various modified silicone varnishes. The surface treatment agent may be used singly or in combinations of two or more types. This allows adjusting the charge quantity of the toner, improving heat-resistant storage, and improving environmental stability.

The content ratio of the external additive A is preferably 0.1 to 6.0 parts by mass, more preferably 0.5 to 2.5 parts by mass, and yet more preferably 1.5 to 2.2 parts by mass, relative to 100 parts by mass of the toner particle.

Binder Resin

The core particle may comprise a binder resin. The binder resin is not particularly limited, and known binder resins can be used herein. For instance, homopolymers of styrene and of substituted products thereof, such as styrene and vinyltoluene; copolymers of aromatic vinyl compounds, such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinylmethyl ketone copolymers, styrene-butadiene copolymers, styrene-isoprene copolymers, styrene-maleic acid copolymers and styrene-maleic acid ester copolymers; homopolymers of aliphatic vinyl compounds and of substituted products thereof, such as ethylene and propylene; vinyl resins such as polyvinyl acetate, polyvinyl propionate, polyvinyl benzoate, polyvinyl butyrate, polyvinyl formate, and polyvinyl butyral; vinyl ether resins; vinyl ketone resins; acrylic polymers; methacrylic polymers; silicone resins; polyester resins; polyamide resins; epoxy resins; phenolic resins; as well as rosin, modified rosin, and terpene resins. The foregoing can be used singly or in combinations of two or more types.

The vinyl copolymers below, for instance aromatic vinyl compounds, acrylic polymerizable monomers and methacrylic polymerizable monomers, can be used as the copolymer of an aromatic vinyl compound.

Examples of aromatic vinyl compounds and substituted products thereof include the following.

Styrene and styrene derivatives such as styrene, α-methyl styrene, β-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxystyrene and p-phenyl styrene.

Examples of acrylic polymerizable monomers, as polymerizable monomer that form acrylic polymers include for instance acrylic acid, methyl acrylate, ethyl acrylate, n-propyl acrylate, iso-propyl acrylate, n-butyl acrylate, iso-butyl acrylate, tert-butyl acrylate, and n-amyl acrylate, n-hexyl acrylate, 2-ethylhexyl acrylate, n-octyl acrylate, n-nonyl acrylate, cyclohexyl acrylate, benzyl acrylate, dimethylphosphate ethyl acrylate, diethylphosphate ethyl acrylate, dibutylphosphate ethyl acrylate and 2-benzoyloxyethyl acrylate.

Examples of methacrylic polymerizable monomers that form methacrylic polymers include for instance methacrylic acid, methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethylphosphate ethyl methacrylate and dibutylphosphate ethyl methacrylate.

Condensation polymers of the carboxylic acid components and the alcohol components listed below can be used as the polyester resin. Examples of the carboxylic acid component include terephthalic acid, isophthalic acid, phthalic acid, fumaric acid, maleic acid, cyclohexanedicarboxylic acid and trimellitic acid. Examples of the alcohol component include bisphenol A, hydrogenated bisphenol, ethylene oxide adducts of bisphenol A, propylene oxide adducts of bisphenol A, glycerin, trimethylolpropane and pentaerythritol.

The polyester resin may be a polyester resin containing a urea group. Carboxy groups in the polyester resin, such as those at the ends, are preferably uncapped.

The binder resin may have a polymerizable functional group for the purpose of improving on changes in the viscosity of the toner at a high temperature. Examples of the polymerizable functional group include vinyl groups, isocyanate groups, epoxy groups, amino groups, carboxy groups and hydroxy groups.

The binder resin is preferably a vinyl resin or a polyester resin, more preferably a vinyl resin. In a case where the binder resin is a vinyl resin, copolymerization may be elicited between the core and the shell of the core-shell structure, and it is possible to prevent adverse effects such as toner breakage or chipping derived from long-term durability.

Among the foregoing, the binder resin is more preferably a styrene (meth) acrylic copolymer typified by styrene-alkyl (meth)acrylate ester copolymers such as styrene-butyl acrylate. The method for producing the polymer is not particularly limited, and a known method can be resorted to herein.

Wax

The toner particle may comprise a wax. A known wax can be used, without particular limitations, as the wax. Examples of the wax include the following. Aliphatic hydrocarbon waxes and derivatives thereof, such as low molecular weight polyethylene, low molecular weight polypropylene, microcrystalline wax, Fischer-Tropsch wax and paraffin wax; oxides of aliphatic hydrocarbon waxes such as oxidized polyethylene wax, or block copolymers thereof; waxes having fatty acid esters as main components, such as carnauba wax and montanate ester waxes; partially or fully deoxidized fatty acid esters, such as deoxidized carnauba wax; saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, seryl alcohol and melissyl alcohol; polyhydric alcohols such as sorbitol; fatty acid amides such as linoleamide, oleamide and lauramide; saturated fatty acid bisamides such as methylene bis(stearamide), ethylene bis (capramide), ethylene bis(lauramide) and hexamethylene bis(stearamide); unsaturated fatty acid amides such as ethylene bis(oleamide), hexamethylene bis(oleamide), N,N'-dioleyladipamide and N,N'-dioleylsebacamide; aromatic bisamides such as m-xylene bis(stearamide) and N,N'-distearyl isophthalamide; aliphatic metal salts (generally referred to as metal soaps) such as calcium stearate, calcium laurate, zinc stearate and magnesium stearate; aliphatic hydrocarbon waxes grafted with vinylic monomers such as styrene and acrylic acid; partially esterified products of fatty acids and polyhydric alcohols such as behenic acid monoglyceride; and methyl ester compounds having hydroxyl groups and obtained through hydrogenation of for instance plant-based oils and fats. The above waxes may be used singly or in combinations of two or more types.

Examples of aliphatic alcohols that form ester waxes include 1-hexanol, 1-heptanol, 1-octanol, 1-nonanol, 1-decanol, undecyl alcohol, lauryl alcohol, myristyl alcohol, 1-hexadecanol, stearyl alcohol, arachidyl alcohol, behenyl alcohol and lignoceryl alcohol. Examples of aliphatic carboxylic acids include pentanoic acid, hexanoic acid, heptanoic acid, octanoic acid, nonanoic acid, decanoic acid, lauric acid, myristic acid, palmitic acid, stearic acid, arachidic acid, behenic acid and lignoceric acid.

The content of wax is preferably from 0.5 parts by mass to 30.0 parts by mass, relative to 100.0 parts by mass of the binder resin or the polymerizable monomer.

Colorant

The toner particle may comprise a colorant. The colorant is not particularly limited, and for example, the known colorants described below may be used.

Examples of yellow pigments include yellow iron oxide, Naples yellow, naphthol yellow S, Hansa yellow G, Hansa yellow 10G, benzidine yellow G, benzidine yellow GR, quinoline yellow lake, permanent yellow NCG, condensed azo compounds such as tartrazine lake, and isoindolinone compounds, anthraquinone compounds, azo metal complexes, methine compounds and allylamide compounds. Specific examples include C.I. pigment yellow 12, 13, 14, 15, 17, 62, 74, 83, 93, 94, 95, 109, 110, 111, 128, 129, 147, 155, 168 and 180.

Examples of orange pigments include permanent orange GTR, pyrazolone orange, Vulcan orange, benzidine orange G, indanthrene brilliant orange RK and indanthrene brilliant orange GK.

Examples of red pigments include red iron oxide, permanent red 4R, lithol red, pyrazolone red, watching red calcium salt, lake red C, lake red D, brilliant carmine 6B, brilliant carmine 3B, eosin lake, rhodamine lake B, condensed azo compounds such as alizarin lake, and diketopyrrolopyrrole compounds, anthraquinone compounds, quinacridone compounds, basic dye lake compounds, naphthol compounds, benzimidazolone compounds, thioindigo compound and perylene compounds.

Specific examples include C.I. pigment red 2, 3, 5, 6, 7, 23, 48:2, 48:3, 48:4, 57:1, 81:1, 122, 144, 146, 150, 166, 169, 177, 184, 185, 202, 206, 220, 221, 254 and 269.

Examples of blue pigments include alkali blue lake, Victoria blue lake, phthalocyanine blue, metal-free phthalocyanine blue, phthalocyanine blue partial chloride, copper phthalocyanine pigments such as fast sky blue and indathrene blue BG and derivatives of these, and anthraquinone compounds, basic dye lake compounds and the like. Specific examples include C.I. pigment blue 1, 7, 15, 15:1, 15:2, 15:3, 15:4, 60, 62 and 66.

Examples of violet pigments include Fast Violet B and Methyl Violet Lake. Examples of green pigments include Pigment Green B, Malachite Green Lake, and Final Yellow Green G.

Examples of white pigments include zinc oxide, titanium oxide, antimony white and zinc sulfide.

Examples of black pigments include carbon black, aniline black, non-magnetic ferrite, magnetite, and colorants that are color-matched to black using the above yellow colorants, red colorants and blue colorants. These colorants can be used singly or in mixtures thereof, and also in a solid solution state.

The colorant may be surface-treated, as the case may require, with a substance that does not inhibit polymerization.

The content of the colorant is preferably from 1.0 part by mass to 15.0 parts by mass, relative to 100.0 parts by mass of the binder resin or the polymerizable monomer.

Charge Control Agent

The toner particle may contain a charge control agent. A known agent can be used as the charge control agent, but preferred herein is a charge control agent having a high triboelectric charging rate and that is capable of stably maintaining a constant triboelectric charge quantity. In a case where the toner particle is produced in accordance with a polymerization method, a charge control agent is preferable that has low polymerization inhibition properties and such that there is substantially no solubilized material in an aqueous medium.

The charge control agent may be a charge control agent that controls the toner so as to exhibit negative chargeability or so as to exhibit positive chargeability.

Examples of charge control agents that control toner so as to exhibit negative chargeability include the following: Monoazo metal compounds, acetylacetone metal compounds, metal compounds of aromatic oxycarboxylic acids, aromatic dicarboxylic acids, oxycarboxylic acids and dicarboxylic acids; aromatic oxycarboxylic acids, aromatic mono- and polycarboxylic acids and metal salts, anhydrides and esters thereof; phenol derivatives such as bisphenols; as well as urea derivatives, metal-containing salicylic acid-based compounds, metal-containing naphthoic acid-based compounds, boron compounds, calixarenes, and resin-based charge control agents.

Examples of the charge control agents that control as toner so to exhibit positive chargeability include the following.

Nigrosin and modified products thereof with a fatty acid metal salt; guanidine compounds; imidazole compounds; onium salts such as quaternary ammonium salts, for instance tributylbenzylammonium 1-hydroxy-4-naphthosulfonate salt and tetrabutylammonium tetrafluoroborate, and analogues thereof, and phosphonium salts that are analogues of the foregoing, as well as lake pigments of the foregoing; plus triphenylmethane dyes and lake pigments thereof (examples of laking agents include phosphotungstic acid, phosphomolybdic acid, phosphotungstomolybdic acid, tannic acid, lauric acid, gallic acid, ferricyanide compounds and ferrocyanide compounds); and also metal salts of higher fatty acids, and resin-based charge control agents.

The charge control agent can be used singly or in combinations of two or more types. Preferred among these charge control agents are metal-containing salicylic acid-based compounds, in particular compounds such that the metal thereof is aluminum or zirconium.

The addition amount of the charge control agent is preferably from 0.1 parts by mass to 20.0 parts by mass, more preferably from 0.5 parts by mass to 10.0 parts by mass, relative to 100.0 parts by mass of the binder resin.

As a charge control resin there is preferably used a polymer or copolymer having a sulfonic acid group, a sulfonic acid salt group or a sulfonic acid ester group. Preferably, the polymer having a sulfonic acid group, a sulfonic acid base or a sulfonic acid ester group contains in particular 2 mass % or more, as a copolymerization ratio, of a sulfonic acid group-containing acrylamide-based monomer or a sulfonic acid group-containing methacrylamide-based monomer. More preferably, the content is 5 mass % or higher, as a copolymerization ratio.

Preferably, the charge control resin has a glass transition temperature (Tg) from 35° C. to 90° C., a peak molecular weight (Mp) from 10,000 to 30,000, and a weight-average molecular weight (Mw) from 25,000 to 50,000.

When such a charge control resin is used, preferred triboelectric charging characteristics can be imparted, without affecting the thermal characteristics required from the toner particle. The charge control resin contains a sulfonic acid group, and accordingly there can be improved both the dispersibility of the charge control resin itself in a colorant dispersion, and the dispersibility of the colorant; moreover, also tinting strength, transparency, and triboelectric charging characteristics can be enhanced.

A method for obtaining a toner will be described in detail next.

Shell Formation Method

The toner particle has a shell. The shell comprises a polymer having monomer units represented by Formula (I).

The method for obtaining the polymer having monomer units represented by Formula (I) is not particularly limited, and a known method can be resorted to herein. Examples include the following method. A method for polymerizing a polymerizable monomer the form of which after the reaction is that of the monomer units represented by Formula (I). Concrete examples include the following polymerizable monomers.

For instance 3-(methacryloyloxy)propyltris(trimethylsilyloxy)silane, 3-(acryloyloxy)propyltris(trimethylsilyloxy)silane, 3-(methacryloyloxy)propyltris(triethylsilyloxy)silane, 3-(methacryloyloxy)hexyltris(trimethylsilyloxy)silane and 3-(methacryloyloxy)octyltris(trimethylsilyloxy)silane.

The above polymerizable monomers can also be obtained through synthesis. The synthesis method is not particularly limited, and a known method can be resorted to herein. For instance, polymerizable monomers can be obtained through a reaction between a trifunctional silane and a monofunctional silane, listed below. The trifunctional silane is a compound represented by Formula (II).

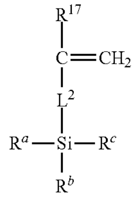

(II)

In Formula (II), $L^2$ represents $—COO(CH_2)_n—$ (where n is an integer of 1 to 10). Further, $R^{17}$ represents hydrogen or a methyl group Further, $R^a$, $R^b$ and $R^c$ are each independently a halogen atom, a hydroxy group or an alkoxy group (preferably having 1 to 3 carbon atoms).

Concrete examples include the following. For instance 3-methacryloxymethyltrimethoxysilane, 3-methacryloxypropyltrimethoxysilane, acryloxypropyltrimethoxysilane, 3-methacryloxypropylethoxydimethoxysilane, 3-methacryloxypropyltriethoxysilane, acryloxypropyltriethoxysilane, 3-methacryloxypropyltrichlorosilane, 3-methacryloxypropylmethoxydichlorosilane, 3-methacryloxypropyldimethoxychlorosilane, 3-methacryloxymethyltrihydroxysilane, 3-methacryloxypropyltrihydroxysilane, acryloxypropyltrihydroxysilane, 3-methacryloxypropylethoxydihydroxysilane.

The monofunctional silane is a compound represented by Formula (III).

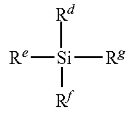

(III)

In the formula, $R^d$, $R^e$ and $R^f$ represent each independently an alkyl group having 1 to 4 (preferably 1 to 3, more preferably 1 or 2, and yet more preferably 1) carbon atoms, and $R^g$ is a halogen atom, a hydroxy group or an alkoxy group (preferably having 1 to 3 carbon atoms).

Concrete examples include the following. Trimethylethoxysilane, triethylmethoxysilane, triethylethoxysilane, tripropylethoxysilane, chlorotrimethylsilane, chlorotriethylsilane and chlorotripropylsilane.

The halogen atoms, hydroxy groups or alkoxy groups of the trifunctional silane (hereafter also referred to as reactive group) hydrolyze/condense, each independently, with the halogen atom, hydroxy group or alkoxy group of the monofunctional silane (hereafter also referred to as reactive group). A polymerizable monomer that forms monomer units represented by Formula (I) can be obtained as a result.

The method for forming the shell comprising the polymer having monomer units represented by Formula (I) is not particularly limited, and a known method can be resorted to. Examples include a method that involves polymerizing a polymerizable monomer that forms a shell in an aqueous medium having core particles dispersed therein, to form a shell on the core particles. Further examples include a method that involves adding a polymerizable monomer that forms a shell, during the below-described production process of the core particles, and polymerizing the monomer, to thereby form a shell, and a method that involves polymerizing a polymerizable monomer that forms a shell, and adding the obtained polymer during the below-described production process of core particles, to thereby form a shell.

Preferred among the foregoing is a method of polymerizing a polymerizable monomer for forming a shell, in an aqueous medium having core particles dispersed therein, to form a shell on the core particles, since such a method allows increasing the coverage ratio of the shell.

The shell formation method will be described in more detail below. To form a shell on the core particle, the method preferably includes a step (step 1) of dispersing core particles in an aqueous medium, to obtain a core particle dispersion, and a step (step 2) of forming a shell containing a polymer that includes the monomer units represented by Formula (I).

The method for obtaining a core particle dispersion in step 1 include a method that involve using, as-is, a dispersion of the produced core particles, in an aqueous medium, and a method that involves adding dried core particles into an aqueous medium, and mechanically dispersing in the whole. A dispersion aid may be used to disperse the dried core particles in an aqueous medium.

Known dispersion stabilizers, surfactants and the like can be used as the dispersion aid. Concrete examples of dispersion stabilizers include inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina; as well as organic dispersion stabilizers such as polyvinyl alcohol, gelatin, methyl cellulose, methyl hydroxypropyl cellulose, ethyl cellulose, sodium carboxymethyl cellulose and starch. Examples of the surfactant include anionic surfactants such as alkyl sulfate ester salts, alkylbenzene sulfonate salts and fatty acid salts; nonionic surfactants such as polyoxyethylene alkyl ethers and polyoxypropylene alkyl ethers; and cationic surfactants such as alkylamine salts and quaternary ammonium salts. Among the foregoing, the dispersion preferably contains an inorganic dispersion stabilizer, more preferably a dispersion stabilizer that includes a phosphate salt such as tricalcium phosphate, hydroxyapatite, magnesium phosphate, zinc phosphate and aluminum phosphate.

In step 2 the polymerizable monomer for forming the shell may be added, as-is, to the core particle dispersion; alternatively, the dispersion resulting from dispersing the polymerizable monomer in ion-exchanged water may be added to the core particle dispersion. Among the foregoing it is preferable to add a dispersion resulting from dispersing the polymerizable monomer in ion-exchanged water, since in that case the shell can be readily formed uniformly. The disperser used to disperse the polymerizable monomer in ion-exchanged water may be for instance a homogenizer, a ball mill, a colloid mill or an ultrasonic disperser.

Addition of the polymerization initiator can be accomplished at an arbitrary timing, and for the required duration. A water-soluble initiator is ordinarily used as the polymerization initiator. Examples include the following. Ammonium persulfate, potassium persulfate, 2,2'-azobis(N,N'-dimethyleneisobutyroamidine) hydrochloride, 2,2'-azobis(2-aminodinopropane) hydrochloride, azobis(isobutylamidine) hydrochloride, 2,2'-sodium azobisisobutyronitrile sulfonate, ferrous sulfate and hydrogen peroxide.

These polymerization initiators can be used singly or in combinations of two or more types; also, a chain transfer agent, a polymerization inhibitor or the like can be further added and used for the purpose of controlling the degree of polymerization of the polymerizable monomer. The weight-average molecular weight (Mw) of the polymer can be adjusted on the basis of the reaction temperature, reaction time, initiator amount and amount of chain transfer agent. The weight-average molecular weight (Mw) of the polymer in the shell is preferably 9000 to 120000, more preferably 11000 to 110000, and yet more preferably 15000 to 100000.

Production of Core Particles

A known production method may be used to produce the core particles; a dry method such as kneading pulverization, or a wet method such as suspension polymerization, dissolution suspension, emulsification aggregation or emulsification polymerization aggregation can be resorted to herein. In particular, a wet production method can be preferably used from the viewpoint of sharpening the particle size distribution of the toner particle, improving the average circularity of the toner particle, and forming a core-shell structure. As an example, a method for obtaining core particles by suspension polymerization will be described below.

Firstly, a polymerizable monomer capable of generating a binder resin and various additives, as needed, are mixed, whereupon a dissolved or dispersed polymerizable monomer composition is prepared using a disperser. Examples of various additives include colorants, waxes, charge control agents, polymerization initiators and chain transfer agents. Examples of the disperser include homogenizers, ball mills, colloidal mills and ultrasonic dispersers.

Next, the polymerizable monomer composition is charged into an aqueous medium containing poorly water-soluble inorganic fine particles, and droplets of the polymerizable monomer composition are prepared (granulating step) using a high-speed disperser such as a high-speed stirrer or ultrasonic disperser.

The polymerizable monomer in the droplet is thereafter polymerized, to yield core particles (polymerization step).

The polymerization initiator may be mixed in during preparation of the monomer composition, or may be mixed into the polymerizable monomer composition directly before formation of the droplets in the aqueous medium. Further, the polymerization initiator may be added during droplet granulation or after granulation completion, i.e. can be added directly before the polymerization reaction is initiated, in a state where the polymerization initiator is dissolved as needed in the polymerizable monomer or another solvent. After polymerization of the polymerizable monomer to obtain a binder resin, a solvent removal treatment may be carried out as needed, to yield a dispersion of core particles.

When obtaining the binder resin for instance by emulsification aggregation or by suspension polymerization, a conventionally known monomer may be used as the polymerizable monomer, without particular limitations. Concrete examples include the vinylic monomers exemplified in the section on the binder resin.

A known polymerization initiator may be used, without particular limitations, as the polymerization initiator. Concrete examples include the following.

Peroxide-based polymerization initiator typified by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenyl acetate-tert-butyl hydroperoxide, tert-butyl performate, tert-butyl peracetate, tert-butyl perbenzoate, tert-butyl perphenylacetate, tert-butyl permethoxyacetate, N-(3-toluoyl)perpalmitate-tert-butyl benzoylperoxide, t-butyl peroxy2-ethylhexanoate, t-butyl peroxypivalate, t-butylperoxyisobutyrate, t-butylperoxyneodecanoate, methyl ethyl ketone peroxide, diisopropyl peroxycarbonate, cumene hydroperoxide, 2,4-dichlorobenzoyl peroxide and lauroyl peroxide; and azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-hydroxy-2,4-dimethylvaleronitrile and azobisisobutyronitrile.

Production of the organosilicon polymer fine particles as the external additive A is as described above. Any method may be used for producing the silica fine particles, but a sol-gel method is preferable herein. The method for producing silica fine particles in accordance with a sol-gel method will be described below. Firstly, an alkoxysilane is hydrolyzed and condensed in an organic solvent in which water is present, using a catalyst, to yield a silica sol suspension. Then the solvent is removed from the silica sol suspension, and the suspension is dried, to obtain silica fine particles.

The major axis of the silica fine particles obtained in accordance with the sol-gel method can be controlled on the basis of the reaction temperature in the hydrolysis/condensation reaction step, the dropping rate of alkoxysilane, the weight ratios of water, the organic solvent and the catalyst, and on the basis of the stirring speed. The silica fine particles thus obtained are ordinarily hydrophilic and have numerous surface silanol groups. Therefore, when silica fine particles are used as a toner external additive, the surface of the silica fine particles is preferably subjected to a hydrophobic treatment.

The method for the hydrophobic treatment may be a method that involves removing the solvent from a silica sol suspension, with drying, followed by a treatment using a hydrophobic treatment agent, or may be a method that involves adding directly a hydrophobic treatment agent to a silica sol suspension, and performing a treatment simultaneously with drying. From the viewpoint of controlling the half width of the particle size distribution, and controlling the amount of saturation water that is adsorbed, a method is preferred that involves adding a hydrophobizing agent directly to the silica sol suspension.

Examples of the hydrophobization method include a method that involves performing a chemical treatment with an organosilicon compound that reacts with or physically adsorbs onto silica. A preferred method involves herein treating, using an organosilicon compound, silica that has been produced by vapor phase oxidation of a silicon halide compound. Examples of such organosilicon compounds include the following.

Hexamethyldisilazane, trimethylsilane, trimethylchlorsilane, trimethylethoxysilane, dimethyldichlorsilane, methyltricrolsilane, allyldimethylchlorsilane, allylphenyldichlorosilane and benzyldimethylchlorsilane.

Further examples include bromomethyldimethylchlorosilane, α-chloroethyltrichlorosilane, β-chloroethyltrichlorosilane, chloromethyldimethylchlorosilane, triorganosilylmercaptan, trimethylsilylmercaptan and triorganosilyl acrylate.

Further examples include vinyldimethylacetoxysilane, dimethylethoxysilane, dimethyldihydroxysilane, diphenyldiethoxysilane and 1-hexamethyldisiloxane.

Yet further examples include 1,3-divinyltetramethyldisiloxane, 1,3-diphenyltetramethyldisiloxane, and dimethylpolysiloxane having 2 to 12 siloxane units per molecule and having one hydroxy group at the Si of a terminal unit.

The foregoing are used singly or as a mixture of two or more types.

In the case of a treatment with silicone oil, a silicone oil is preferably used that has a viscosity at 25° C. of from 30 $mm^2/s$ to 1000 $mm^2/s$. Examples include dimethyl silicone oil, methyl phenyl silicone oil, α-methyl styrene-modified silicone oil, chlorphenyl silicone oil, and fluorine-modified silicone oil.

Examples of silicone oil treatment methods include the following. A method that involves directly mixing silica and silicone oil using a mixer such as an FM mixer. A method that involves spraying silicone oil on silica. Alternatively, a method that involves dissolving or dispersing silicone oil in an appropriate solvent, followed by addition of silica, mixing, and solvent removal. After being treated with the silicone oil, the silicone oil-treated silica is more preferably heated to a temperature of 200° C. or above (more preferably 250° C. or above) in an inert gas, to stabilize the surface coating.

The silica fine particles may be subjected to a deagglomeration treatment in order to facilitate achieving monodispersity of the silica fine particles on the surface of the toner particle, and in order to bring out a stable spacer effect.

Developer

The toner can be used as a magnetic or non-magnetic one-component developer, but may be used as a two-component developer by being mixed with a carrier.

As the carrier there can be used magnetic particles made up of known materials, for instance metals such as iron, ferrite or magnetite, and alloys of these metals with metals such as aluminum or lead. Ferrite particles are preferably used among the foregoing. For instance, a coated carrier in which the surface of magnetic particles is coated with a coating agent such as a resin, or a resin dispersion-type carrier resulting from dispersing a magnetic fine powder in a binder resin, may be used as the carrier.

The carrier preferably has a volume-average particle diameter from 15 μm to 100 μm, more preferably from 25 μm to 80 μm.

A method for isolating a toner particle from toner will be explained in detail next. To analyze the shell contained in the toner particle, the below-described measurement is carried out using a toner particle isolated from the toner, as follows.

Herein 160 g of sucrose (by Kishida Chemical Co. Ltd.) are added to 100 mL of ion-exchanged water and dissolved therein, while being warmed in a hot water bath, to prepare a sucrose concentrate. Then 31 g of this sucrose concentrate and 6 mL of Contaminon N (10 mass % aqueous solution of a pH-7 neutral detergent for precision measuring instruments, made up of a nonionic surfactant, an anionic surfactant and an organic builder, by Wako Pure Chemical Industries, Ltd.) are introduced into a centrifuge tube (50 mL volume). Then 1.0 g of toner is added to this dispersion, and toner clumps are broken up using a spatula or the like. The centrifuge tube is shaken in a shaker (AS-1N, sold by AS ONE CORPORATION) for 20 minutes at 300 spm (strokes per minute). After shaking, the solution is transferred to a glass tube (50 mL volume) for swing rotors, and is centrifuged under conditions of 3500 rpm for 30 minutes, using a centrifuge (H-9R, by Kokusan Co. Ltd.).

As a result of this operation the toner particle becomes separated from the external additive. Sufficient separation of the toner particle and the aqueous solution is checked visually, and the toner particle separated into the uppermost layer is retrieved using a spatula or the like. The retrieved toner particle is filtered through a vacuum filter and is then dried for 1 hour or longer in a dryer, to yield a measurement sample. This operation is carried out a plurality of times, to secure the required amount.

A method for isolating the polymer contained in the shell from the toner particle will be described in detail next. To isolate and analyze the shell contained in the toner particle, the polymer contained in the shell is isolated from the toner particle, as follows, and then the below-described measurements are carried out. The polymer contained in the shell in the toner particle is retrieved through separation by solvent gradient elution of an extract using tetrahydrofuran (THF). The preparation method is as follows.

Herein 10.0 g of toner particle are weighed, laid on a tubular filter paper (No. 84, by Toyo Roshi Kaisha Ltd.), and are set in a Soxhlet extractor. Extraction is performed for 20 hours using 200 mL of THF as the solvent; the solid fraction obtained upon removal of solvent from the extract is a THF-soluble fraction. The THF-soluble fraction includes the polymer having monomer units represented by Formula (I). The above is performed multiple times, to yield the required amount of THF-soluble fraction.

Gradient preparative HPLC (LC-20AP high-pressure gradient preparative system, by Shimadzu Corporation; SunFire preparative column 50 mmφ 250 mm, by Waters Corporation) is used in the solvent gradient elution method. The column temperature is 30° C., the flow rate is 50 mL/min, and acetonitrile is used as the weak solvent and THF as the strong solvent, in the mobile phase. A sample obtained by dissolving, in 1.5 mL of THF, 0.02 g of the THF-soluble fraction obtained through extraction is used herein as a sample for separation. The mobile phase starts from a composition of 100% acetonitrile, and 5 minutes after sample injection, the ratio of THF is increased by 4% each minute, so that the composition of the mobile phase reaches 100% THF in the course of 25 minutes. Components can be separated through drying of the obtained fractions.

Which fraction component is herein the polymer containing units represented by Formula (I) can be discriminated in accordance with a below-described $^1$H-NMR measurement. The content of the shell of the toner particle can be determined on the basis of the yield after the isolation operation and on the basis of the mass of the toner used for extraction.

Methods for measuring various physical properties will be explained below.

Structural Analysis of the Polymer Contained in the Shell and Method for Calculating the Content Ratio of the Monomer Units Represented by Formula (I)

In a case where the obtained polymer contains units represented by Structural formula (I), the units can be identified on the basis of an $^1$H-NMR measurement.

The concrete measurement method is as follows.

| |
|---|
| Measuring device: FT NMR device JNM-EX400 (by JEOL Ltd.) |
| Measurement frequency: 400 MHz |
| Pulse conditions: 5.0 μs |
| Frequency range: 10500 Hz |
| Number of scans: 64 scans |
| Measurement temperature: 30° C. |

A measurement sample is prepared by placing 50 mg of the sample in a sample tube having an inner diameter of 5 mm, with addition of deuterated chloroform ($CDCl_3$) as a solvent, followed by dissolution, in a thermostatic bath at 40° C. A measurement is performed then under the above conditions using the measurement sample. The content ratio of the monomer units is calculated, in accordance with the expression below, on the basis of an integration value I(a) of a peak attributed to the $R^2$ to $R^{10}$ alkyl group in Structural formula (I), and an integration value I(b) of a peak attributed to methylene groups in the polymer main chain.

$$I(a)/I(b)\times 100$$

Measurement of the Coverage Ratio of the Surface of Core Particles by a Shell Micrographs of a plurality of toner particles are taken using FE-SEMS-4800 (by Hitachi, Ltd.) at 10,000 magnifications. The portions of the toner particles covered with a shell, in the images obtained by observation, are denoted by high brightness while the core particles are denoted by low brightness, and hence the coverage ratio of the toner particle surface by the shell can be quantified by binarization. The binarization conditions can be selected as appropriate depending on the observation device and on sputtering conditions. The image processing software "ImageJ" was used herein for binarization, and a background brightness distribution was eliminated over a flattening radius of 40 pixels, through the Subtract Background menu, followed by binarization with a brightness threshold value of 50.

One toner particle in the image is selected, by software, through image analysis. The surface area of the selected toner particle is obtained next by executing image analysis. This surface area is denoted by S(a). If a dark portion is observed in the toner particle the surface area of which is to be measured, that dark portion is selected using software. Analysis is executed next, to thereby obtain the surface area of the selected dark portion. Further, S(b) denotes the sum total of the surface areas of the observed dark portions in the toner particle. The coverage ratio by the shell is calculated on the basis of the following expression.

$$\text{Coverage ratio (area \%)}=(S(a)-S(b))/S(a)\times 100$$

This measurement is performed on 100 toner particles, and the arithmetic mean value of the measurements is taken as the coverage ratio of the surface of the core particles by the shell.

Measurement of the Particle Diameter of the External Additive A

A micrograph of the surface of the toner is taken using FE-SEMS-4800 (by Hitachi, Ltd.) at 30000 magnifications. The major axis of the external additive is measured using an enlargement of the micrograph; instances where the major axis is from 30 nm to 300 nm are deemed to be of the external additive A. To measure the number-average particle diameter of the external additive A, the major axis of the external additive A present on the surface of 100 or more toner particles is measured, and the number-average value of the results is taken as the number-average particle diameter.

The same measurement can be performed for toners containing a plurality of types of external additive on the surface of the toner particle. Identical types of external additive can be distinguished by identifying the elements of respective fine particles through elemental analysis, such as EDAX, during the observation of backscattered electron images by S-4800. It is moreover possible to select identical types of external additive for instance on the basis of shape features.

Coverage Ratio of the Surface of the Toner Particle by the External Additive A The coverage ratio of the surface of the toner particle by the external additive A is measured on the basis of an observation image (30,000 magnifications) in which the particle diameter of the external additive A is measured. The settings are such that the approximate center of the toner particle lies at the center of the field of view, and such that the toner particle is depicted on the entire field of view. The calculations below are performed using the image processing software "ImageJ", on the basis of the observed image.

Only external additive A having a major axis from 30 nm to 300 nm in the image is selected through particle analysis by software. Next, the surface area of a selection screen is displayed, according to the measurement settings. This value of surface area is divided by the surface area of the entire field of view, to thereby yield the coverage ratio of the external additive A. This measurement is performed for 100 fields of view, and the arithmetic mean value of the measurements is taken as the coverage ratio (area %) of the external additive A.

Method for Measuring Weight-Average Particle Diameter and Number-Average Particle Diameter The weight-average particle diameter and the number-average particle diameter of the toner, the toner particle and the core particles (hereafter also referred to as toner and so forth) are calculated as follows. The measuring device used herein is a precision particle size distribution measuring device "Coulter Counter Multisizer 3" (registered trademark, by Beckman Coulter, Inc.) relying on a pore electrical resistance method and equipped with a 100 μm aperture tube. The measurement conditions are set, and measurement data analyzed, using dedicated software (Beckman Coulter Multisizer 3, Version 3.51", by Beckman Coulter, Inc.) ancillary to the device. The measurements are performed in 25,000 effective measurement channels.

An aqueous electrolyte solution used in the measurements can be prepared through dissolution of special-grade sodium chloride to a concentration of about 1.0 mass % in ion-exchanged water; for instance "ISOTON II" (by Beckman Coulter, Inc.) can be used herein as the aqueous electrolyte solution.

The dedicated software is set up as follows, prior to measurement and analysis.

In the screen of "Modification of the Standard Operating Mode (SOMME)" of the dedicated software, a Total Count of the Control Mode is set to 50,000 particles, a number of measurements is set to one, and a Kd value is set to a value obtained using "Standard particles 10.0 μm" (by Beckman Coulter). The "Threshold/Noise Level Measurement Button" is pressed, to thereby automatically set a threshold value and a noise level. Then the current is set to 1600 μA, the gain is set to 2, the electrolyte solution is set to ISOTON II, and "Flushing of the Aperture Tube Following Measurement" is ticked.

In the screen for "Setting Conversion from Pulses to Particle Diameter" of the dedicated software, the Bin Interval is set to a logarithmic particle diameter, the Particle Diameter Bin is set to 256 particle diameter bins, and the Particle Diameter Range is set to range from 2 μm to 60 μm.

A concrete measurement method is as described below.

(1) Herein 200.0 mL of the aqueous electrolyte solution are placed in a 250 mL round-bottomed glass beaker ancillary to Multisizer 3. The beaker is set on a sample stand is stirred counterclockwise with a stirrer rod at 24 rotations per second. Dirt and air bubbles are then removed from the aperture tube by way of the "Aperture Flush" function of the dedicated software.

(2) Then about 30 mL of the aqueous electrolyte solution are placed in a 100 mL flat-bottomed glass beaker. To the solution there is added, as a dispersing agent, about 0.3 mL of a dilution of "Contaminon N" (10 mass % aqueous solution of a pH-7 neutral detergent for precision measuring instruments, made up of a nonionic surfactant, an anionic surfactant and an organic builder, by Wako Pure Chemical Industries), diluted thrice by mass in ion-exchanged water.

(3) An ultrasonic disperser is prepared having an electrical output of 120 W "Ultrasonic Dispersion System Tetora 150" (by Nikkaki Bios Co., Ltd.), internally equipped with two oscillators that oscillate at a frequency of 50 kHz and are disposed at a phase offset by 180 degrees. Then 3.3 L of ion-exchanged water are charged into a water tank of the ultrasonic disperser, and 2.0 mL of Contaminon N are added to the water tank.

(4) The beaker in (2) is set in a beaker-securing hole of the ultrasonic disperser, which is then operated. The height position of the beaker is adjusted so as to maximize a resonance state at the liquid level of the aqueous electrolyte solution in the beaker.

(5) With the aqueous electrolyte solution in the beaker of (4) being ultrasonically irradiated, about 10 mg of the toner particle are then added little by little to the aqueous electrolyte solution, to be dispersed therein. The ultrasonic dispersion treatment is further continued for 60 seconds. The water temperature of the water tank during ultrasonic dispersion is adjusted as appropriate to be from 10° C. to 40° C.

(6) The aqueous electrolyte solution in (5) containing for instance the dispersed toner is added dropwise, using a pipette, to the round-bottomed beaker of (1) set inside the sample stand, and the measurement concentration is adjusted to about 5%. A measurement is then performed until the number of measured particles reaches 50000.

(7) Measurement data is analyzed using the dedicated software ancillary to the apparatus, to calculate the weight-average particle diameter and number-average particle diameter. The "Average Diameter" in the "Analysis/Volume Statistics (arithmetic average)" screen, upon setting of Graph/volume % in the dedicated software, yields herein the weight-average particle diameter. The "Average diameter" of the "Analysis/number statistical value (arithmetic mean)" screen, upon setting of graph/number % in the dedicated software, yields herein the number-average particle diameter.

Method for Measuring Number-Average Molecular Weight (Mn) and Weight-Average Molecular Weight (Mw)

The number-average molecular weight (Mn) and weight-average molecular weight (Mw) of a THF-soluble fraction of the polymer, resin or toner particle are measured by gel permeation chromatography (GPC), as follows.

Firstly, a sample is dissolved in tetrahydrofuran (THF) at room temperature for 24 hours. The obtained solution is then filtered through a solvent-resistant membrane filter "MYSYORI DISC" (by Tosoh Corporation) having a pore diameter of 0.2 to obtain a sample solution. The sample solution is adjusted so that the concentration of the component soluble in THF is about 0.8 mass %. This sample solution is then used for measurements under the following conditions.

| |
|---|
| Device: HLC8120 GPC (detector: RI) (by Tosoh Corporation) |
| Column: 7 columns Shodex KF-801, 802, 803, 804, 805, 806, 807<br>(by Showa Denko KK) |
| Eluent: tetrahydrofuran (THF) |
| Flow rate: 1.0 mL/min |
| Oven temperature: 40.0° C. |
| Sample injection volume: 0.10 mL |

To calculate the molecular weight of the sample there is used a molecular weight calibration curve created using a standard polystyrene resin (product name "TSK STANDARD POLYSTYRENE F-850, F-450, F-288, F-128, F-80, F-40, F-20, F-10, F-4, F-2, F-1, A-5000, A-2500, A-1000 or A-500", by Tosoh Corporation).

EXAMPLES

The present invention will be explained more specifically hereafter with reference to the examples below. However, these examples are not meant to limit the present invention in any way. A toner and a toner production method will be described below. Unless otherwise specified, the language "parts" and "%" in the formulations of the examples and comparative examples refers to parts by mass in all instances.

Production Example of a Core Particle Dispersion

Core Particle Dispersion 1

Herein 11.2 parts of sodium phosphate (dodecahydrate) were charged into a reaction vessel containing 390.0 parts of ion-exchanged water, and the whole was kept warm at 65° C. for 1.0 hour while under purging with nitrogen. Stirring was carried out at 12000 rpm using T. K. Homomixer (by Tokushu Kika Kogyo Co., Ltd.). While stirring was maintained, an aqueous solution of calcium chloride resulting from dissolving 7.4 parts of calcium chloride (dihydrate) in 10.0 parts of ion-exchanged water was added, all at once, into the reaction vessel, to prepare an aqueous medium that contained a dispersion stabilizer. Further, 1.0 mol/L hydrochloric acid was added to the aqueous medium in the reaction vessel, to adjust the pH to 6.0 and prepare Aqueous medium 1.

Preparation of Polymerizable Monomer Composition 1

| | |
|---|---|
| Styrene | 60.0 parts |
| C.I. Pigment Blue 15:3 | 6.3 parts |

The above materials were charged into an attritor (by Nippon Coke & Engineering Co., Ltd.), with further dispersion at 220 rpm for 5.0 hours using zirconia particles having a diameter of 1.7 mm, to prepare Colorant-dispersed solution 1 having a pigment dispersed therein.

Next, the following materials were added to Colorant-dispersed solution 1

| | |
|---|---|
| Styrene | 10.0 parts |
| n-butyl acrylate | 30.0 parts |
| Polyester resin (condensation polymer of terephthalic acid and a propylene oxide 2-mole adduct of bisphenol A, weight-average molecular weight Mw = 10000, acid value: 8.2 mgKOH/g) | 5.0 parts |
| Hydrocarbon wax HNP9 (melting point: 76° C., produced by Nippon Seiro Co., Ltd.) | 6.0 parts |

The above materials were kept warm at 65° C., and were dissolved and dispersed uniformly at 500 rpm, to prepare Polymerizable monomer composition 1, using T. K. Homomixer.

Granulating Step

While the temperature of Aqueous medium 1 was maintained at 70° C. and the rotational speed of the stirrer was maintained at 12500 rpm, Polymerizable monomer composition 1 was added to Aqueous medium 1, and 8.0 parts of the polymerization initiator t-butyl peroxypivalate were further added. Granulation was carried out for 10 minutes while maintaining 12500 rpm as it was, using the stirrer.

Polymerization Step

The stirrer was changed from a high-speed stirrer to a stirrer provided with a propeller stirring blade, and then a polymerization reaction was conducted by performing polymerization for 5.0 hours, with the temperature held at 70° C. and while under stirring at 200 rpm, with further raising of the temperature to 85° C. and heating for 2.0 hours. Further, the residual monomer was removed through raising of the temperature to 98° C. and heating for 3.0 hours, and ion-exchanged water was added to adjust the core particle concentration in the dispersion to 30.0%, to yield Core particle dispersion 1 having Core particles 1 dispersed therein. The Core particles 1 had a number-average particle diameter (D1) of 6.3 μm and a weight-average particle diameter (D4) of 6.9 μm.

Core Particle Dispersion 2

The materials below were weighed, mixed and dissolved.

| | |
|---|---|
| Styrene | 70.0 parts |
| n-butyl acrylate | 25.1 parts |
| Acrylic acid | 1.3 parts |
| Hexanediol diacrylate | 0.4 parts |
| n-lauryl mercaptan | 3.2 parts |

Herein a 10% aqueous solution of Neogen RK (by DKS Co., Ltd.) was added to the above solution, and the whole was dispersed using T. K. Homomixer (by Tokushu Kika Kogyo Co., Ltd.). An aqueous solution resulting from dissolving 0.15 parts of potassium persulfate in 10.0 parts of ion-exchanged water was further added, while under slow stirring for 10 minutes.

After purging with nitrogen, emulsification polymerization was carried out at a temperature of 70° C. for 6.0 hours. Once polymerization was complete, the reaction solution was cooled to room temperature, and ion-exchanged water was added, to thereby obtain a resin particle dispersion having a solids concentration of 12.5% and a volume-basis median diameter of 0.2 μm.

The following materials were weighed and mixed.

| | |
|---|---|
| Wax (behenyl behenate) | 100.0 parts |
| Neogen RK | 17.0 parts |
| Ion-exchanged water | 385.0 parts |

A wax particle dispersion was obtained through dispersion for 1 hour using a wet-type jet mill JN100 (by Jokoh KK). The solids concentration of the wax particle dispersion was 20.0%.

The following materials were weighed and mixed.

| | |
|---|---|
| C.I. Pigment Blue 15:3 | 63.0 parts |
| Neogen RK | 17.0 parts |
| Ion-exchanged water | 920.0 parts |

A colorant particle dispersion was obtained through dispersion for 1 hour using a wet-type jet mill JN100. The solids concentration of the colorant particle dispersion was 10.0%.

| | |
|---|---|
| Resin particle dispersion | 160.0 parts |
| Wax particle dispersion | 10.0 parts |
| Colorant particle dispersion | 18.9 parts |
| Magnesium sulfate | 0.3 parts |

The above materials were dispersed using a homogenizer (by IKA KK), followed by heating up to 65° C. while under stirring. After stirring at 65° C. for 1.0 hour, the dispersion was observed using an optical microscope; it was found that aggregated particles had formed that exhibited a number-average particle diameter of 6.0 After addition of 2.5 parts of Neogen RK (by DKS Co., Ltd.), the temperature was raised to 80° C. and the whole was stirred for 2.0 hours, to elicit fusion. After cooling, the product was filtered, and the filtered solid was washed with 720.0 parts of ion-exchanged water, by stirring for 1.0 hour. The solid was filtered again, and was thereafter dried, to yield Core particles 2.

Herein 11.2 parts of sodium phosphate (dodecahydrate) were charged into a reaction vessel containing 390.0 parts of ion-exchanged water, and the whole was kept warm at 65° C. for 1.0 hour while under purging with nitrogen. An aqueous solution of calcium chloride resulting from dissolving 7.4 parts of calcium chloride (dihydrate) in 10.0 parts of ion-exchanged water was added, all at once, while under stirring at 12500 rpm using T. K. Homomixer (by Tokushu Kika Kogyo Co., Ltd.), to prepare an aqueous medium that contained a dispersion stabilizer. Further, 1.0 mol/L hydrochloric acid was added to the aqueous medium in the reaction vessel, to adjust the pH to 6.0, and prepare Aqueous medium 2.

Then 100.0 parts of Core particles 2 were added to Aqueous medium 2, and the whole was dispersed for 30 minutes while under rotation at 5000 rpm using T. K. Homomixer, at a temperature of 60° C. Ion-exchanged water was added to adjust the solids concentration of Core particles 2 in the dispersion to 30.0%, and yield Core particle dispersion 2. The Core particles 2 had a number-average particle diameter (D1) of 6.3 μm and a weight-average particle diameter (D4) of 7.5 μm.

Core Particle Dispersion 3

Preparation Step of Polyester Resin 1

Terephthalic acid: 11.1 mol parts

Propylene oxide 2-mole adduct of bisphenol A (PO-BPA): 10.9 mol parts

The above monomers were charged into an autoclave together with an esterification catalyst; then a pressure-reducing device, a water separation device, a nitrogen gas introduction device, a temperature measuring device and a stirrer were fitted to the autoclave, whereupon a reaction was conducted in a nitrogen atmosphere and while the pressure was reduced, at 215° C., in accordance with an ordinary method, until Tg was 70° C., to yield Polyester resin 1. The obtained Polyester resin 1 had a weight-average molecular weight (Mw) of 7,930 and a number-average molecular weight (Mn) of 3,090.

Preparation Step of Polyester Resin 2

| | |
|---|---|
| Ethylene oxide 2-mole adduct of bisphenol A | 725 parts |
| Phthalic acid | 285 parts |
| Dibutyl tin oxide | 2.5 parts |

The above materials were caused to react for 7 hours while under stirring, at 220° C., and then for 5 hours under reduced pressure, followed by cooling down to 80° C., and a 2-hour reaction with 190 parts of isophorone diisocyanate in ethyl acetate, to yield an isocyanate group-containing polyester resin. Then 25 parts of the isocyanate group-containing polyester resin and 1 part of isophorone diamine were caused to react at 50° C. for 2 hours, to yield Polyester resin 2 having, as a main component, a polyester that contained urea groups. The obtained Polyester resin 2 had a weight-average molecular weight (Mw) of 22,000 and a number-average molecular weight (Mn) of 3,020.

Preparation Step of Core Particles 3

Herein 700 parts of ion-exchanged water, 1000 parts of a 0.1 mol/L aqueous solution of sodium phosphate and 24.0 parts of 1.0 mol/L hydrochloric acid were added to a five-port pressure-resistant vessel equipped with a reflux tube, a stirrer, a thermometer, and a nitrogen introduction tube, with holding at 63° C. while under stirring at 12,000 rpm using a high-speed stirrer T. K. Homomixer (by Tokushu Kika Kogyo Co., Ltd.). Then 85 parts of a 1.0 mol/L aqueous solution of calcium chloride were gradually added thereto, to prepare Aqueous dispersion medium 3 containing a dispersion stabilizer. A toner particle precursor composition was produced thereafter using the following starting materials.

| | |
|---|---|
| Polyester resin 1 | 60.0 parts |
| Polyester resin 2 | 40.0 parts |
| C.I. Pigment Blue 15:3 | 6.5 parts |
| Charge control agent (aluminum compound of 3,5-di-tert-butylsalicylic acid) | 0.5 parts |
| Wax (behenyl behenate) | 10.0 parts |

The above materials were dissolved in 400 parts of toluene and were heated up to 63° C., to yield a toner particle precursor composition. Next, the above composition was added to Aqueous dispersion medium 3, with granulation for 5 minutes while under stirring at 12,000 rpm using a high-speed stirrer. Thereafter, the high-speed stirrer was changed to a propeller-type stirrer, and the internal temperature was raised to 70° C. The time required for raising the temperature was 10 minutes. The temperature was further raised to 95° C. while under slow stirring, and toluene was removed through heating for 5.0 hours.

After cooling, the solids concentration of Core particles 3 was adjusted to 30.0%, to yield Core particle dispersion 3. The Core particles 3 had a number-average particle diameter (D1) of 6.2 μm and a weight-average particle diameter (D4) of 7.4 μm.

Core Particle Dispersion 4

| | |
|---|---|
| Binder resin: copolymer of styrene and n-butyl acrylate (Styrene: n-butyl acrylate copolymer ratio = 70:30, Mp = 22000, Mw = 35000, Mw/Mn = 2.4) | 100.0 parts |
| C.I. Pigment Blue 15:3 | 6.3 parts |
| Amorphous polyester resin (condensate of terephthalic acid and propylene oxide-modified bisphenol A, Mw: 7800, Tg: 70° C., acid value 8.0 mgKOH/g) | 5.0 parts |
| Fischer-Tropsch wax (melting point 78° C.) | 5.0 parts |

The above materials were premixed in an FM mixer (by Nippon Coke & Engineering Co., Ltd.) and were then melt-kneaded in a twin-screw kneader (PCM-30 model, by Ikegai Corporation), to yield a kneaded product. The obtained kneaded product was cooled and was coarsely pulverized with a hammer mill (by Hosokawa Micron Corporation), followed by pulverization using a mechanical pulverizer (T-250, by Turbo Kogyo Co., Ltd.), to yield a finely pulverized powder. The obtained finely pulverized powder was classified using a multi-grade classifier (EJ-L-3 model, by Nittetsu Mining Co., Ltd.) relying on the Coanda effect, to yield Core particles 4.

Then 11.2 parts of sodium phosphate (dodecahydrate) were charged into a reaction vessel containing 390.0 parts of ion-exchanged water, and the whole was kept warm at 65° C. for 1.0 hour, while under purging with nitrogen.

Stirring was carried out at 12500 rpm using T. K. Homomixer (by Tokushu Kika Kogyo Co., Ltd.). While stirring was maintained, an aqueous solution of calcium chloride resulting from dissolving 7.4 parts of calcium chloride (dihydrate) in 10.0 parts of ion-exchanged water was added, all at once, to prepare an aqueous medium that contained a dispersion stabilizer. Further, 1.0 mol/L hydrochloric acid was added to the aqueous medium in the reaction vessel, to adjust the pH to 6.0 and prepare Aqueous medium 4.

Then 200.0 parts of Core particles 4 were added to Aqueous medium 4, with dispersion for 30 minutes while under rotation at 5000 rpm using T. K. Homomixer, at a temperature of 60° C. Ion-exchanged water was added to adjust the toner particle concentration in the dispersion to 30.0%, and yield Core particle dispersion 4. The Core particles 4 had a number-average particle diameter (D1) of 5.3 μm and a weight-average particle diameter (D4) of 6.8 μm.

Preparation of Silica Fine Particles 1

Herein 687.9 parts of methanol, 42.0 parts of pure water and 47.1 parts of 28 mass % aqueous ammonia were charged into a 3 L glass reactor equipped with a stirrer, a dropping funnel and a thermometer, with mixing of the whole. The temperature of the obtained solution was adjusted to 35° C., and then 1100.0 parts of tetraethoxysilane and 395.2 parts of 5.4 mass % aqueous ammonia were started to be added simultaneously, while under stirring. Tetraethoxysilane was added dropwise over 5 hours, and aqueous ammonia was added dropwise over 4 hours. Once dropwise addition was complete, stirring was further continued for 0.2 hours, to yield a methanol-water dispersion of hydrophilic spherical sol-gel silica fine particles.

Next, an ester adapter and a cooling tube were fitted to the glass reactor, and the above dispersion was heated at 65° C., to distill methanol off. Thereafter pure water was added in the same amount as that of the methanol having been distilled off. The dispersion was dried at 80° C. under reduced pressure. The obtained silica fine particles were heated at 400° C. for 10 minutes in a thermostatic bath. The obtained silica fine particles (untreated silica) were subjected to a deagglomeration treatment using a pulverizer (by Hosokawa Micron Group).

Subsequently, 100.0 parts of the silica fine particles were charged in a reaction vessel, and then a solution of 5.0 parts of dimethyl silicone oil (by Shin-Etsu Chemical Co., Ltd.: KF96-50CS) diluted in 5.0 parts of n-hexane was sprayed into the reaction vessel while under stirring. Thereafter, the mixture was stirred at 300° C. for 60 minutes under a nitrogen stream, and was dried and cooled, to yield Silica fine particles 1.

Preparation of Silica Fine Particles 2 and 3

Silica fine particles 2 to 3 were prepared in the same way as in the preparation of Silica fine particles 1, but herein the 28 mass % aqueous ammonia was modified to the number of parts given in Table 1, and the dropwise addition time, and the duration of stirring after dropwise addition was over, were modified to the conditions given in Table 1.

Preparation of Silica Fine Particles 4

Herein 100 parts of dry silica fine powder (BET specific surface area 300 $m^2/g$) having a number-average particle diameter of 10 nm was subjected to a hydrophobic treatment with 30 parts of dimethyl silicone oil (by Shin-Etsu Chemical Co., Ltd.: KF96-50CS).

Preparation of Silica Fine Particles 5

The amount of methanol used in the preparation of Silica fine particles 1 was modified to 385.5 parts. Further, the dropwise addition time of tetraethoxysilane was modified to 7 hours, and the dropwise addition time of 5.4 mass % aqueous ammonia was modified to 6 hours, to yield Silica fine particles 5 having a number-average particle diameter of 380 nm.

The Silica fine particles 1 to 5 were spherical particles having a major axis/minor axis of 1.3 or less.

Preparation of Organosilicon Polymer Fine Particles 1

Organosilicon polymer fine particles 1 were prepared in accordance with the following procedure. As a first step, 360 parts of water were charged into a reaction vessel equipped with a thermometer and a stirrer, and 17 parts of hydrochloric acid having a concentration of 5.0 mass % were added, to yield a uniform solution. Then 136 parts of methyltrimethoxysilane were added while under stirring at a temperature of 25° C.; the whole was stirred for 5 hours, followed by filtration, to obtain a transparent reaction solution that contained a silanol compound or a partial condensate thereof.

As a second step, 540 parts of water were charged into a reaction vessel equipped with a thermometer, a stirrer a dropping device, and then 19 parts of aqueous ammonia having a concentration of 10.0 mass % were added, to yield a uniform solution. While under stirring at a temperature of 30° C., 100 parts of the reaction solution obtained in the first step were then added dropwise over 0.60 hours, with stirring for 6 hours, to yield a suspension. The fine particles in the obtained suspension were caused to settle in a centrifuge, were retrieved, and dried in a dryer at a temperature of 180° C. for 24 hours, to yield Organosilicon polymer fine particles 1.

Preparation of Organosilicon Polymer Fine Particles 2 and 3

Organosilicon polymer fine particles 2 to 3 were obtained in the same way as in the preparation of Organosilicon polymer fine particles 1, but herein the number of parts of methyltrimethoxysilane were modified as given in Table 2, and the production conditions were likewise modified as given in Table 2.

Organosilicon polymer fine particles 1 to 3 were all spherical particles having a major axis/minor axis of 1.3 or less.

TABLE 1

| Silica fine particles No. | Production process: 28 mass % aqueous ammonia | Production process: Dropwise addition time | Production process: Stirring time | Number-average particle diameter (nm) |
|---|---|---|---|---|
| 1 | 42.0 parts | 5.0 hours | 0.2 hours | 100 |
| 2 | 36.0 parts | 4.5 hours | 0.0 hours | 50 |
| 3 | 80.0 parts | 5.0 hours | 0.2 hours | 200 |

TABLE 2

| Organosilicon polymer fine particles No. | First step: Addition amount (parts): Methyl-trimethoxysilane | First step: Addition amount (parts): Water | First step: Addition amount (parts): Hydrochloric acid | First step: Reaction temperature | Second step: Addition amount (parts): Reaction solution obtained in first step | Second step: Addition amount (parts): Water | Second step: Addition amount (parts): Aqueous ammonia | Second step: Reaction temperature | Second step: Dropwise addition time h | Number-average particle diameter (nm) |
|---|---|---|---|---|---|---|---|---|---|---|
| 1 | 136 | 360 | 17 | 25° C. | 100 | 540 | 19 | 30° C. | 0.6 | 90 |
| 2 | 136 | 360 | 17 | 25° C. | 100 | 540 | 17 | 30° C. | 1 | 50 |
| 3 | 136 | 360 | 17 | 25° C. | 100 | 540 | 23 | 30° C. | 0.4 | 200 |

Production Example of a Toner Particle

Toner Particle 1

Shell Formation Process

The samples below were weighed in a reaction vessel, and the temperature of the solution was adjusted to 70° C. while under stirring using a propeller stirring blade.

Core particle dispersion 1 333.3 parts

Next, a dispersion was prepared in which 0.4 parts of the polymerizable monomer 3-(methacryloyloxy)propyltris(trimethylsilyloxy)silane used for shell formation and 6.0 parts of ion-exchanged water, and dispersion using a homogenizer. The dispersion was charged into a reaction vessel and was stirred at a temperature of 70° C. using a propeller stirring blade. While maintaining stirring, 0.20 parts of potassium persulfate were added all at once, as a polymerization initiator, to the reaction vessel.

The temperature of the solution was maintained at 70° C., and the solution was held for 3.0 hours while under mixing using a propeller stirring blade. The temperature was lowered to 25° C., and thereafter the pH was adjusted to 1.5 with 1 mol/L hydrochloric acid, with stirring for 1.0 hour, followed by filtration while under washing with ion-exchanged water, to yield Toner particle 1 having a shell.

Toner Particles 2 to 17 and 26

Toner particles 2 to 17 and 26 were obtained in the same way as in the production example of Toner particle 1, but modifying herein the polymerizable monomer as a shell material, and the initiator amount, as given in Table 3.

Toner Particles 18 to 20

Toner particles 18 to 20 were obtained in the same way as in the production example of Toner particle 1, but modifying the production conditions to those given in Table 3.

Toner Particle 21

Toner particle 21 was obtained in the same way as in the production example of Toner particle 1, but modifying herein the shell formation step as given below.

Shell Formation Step

Core particle dispersion 1 was charged into a reaction vessel, the pH was adjusted to 1.5 using 1 mol/L hydrochloric acid, and the whole was stirred for 1.0 hour, followed by filtration while under washing with ion-exchanged water, to yield as a result Toner particle 21.

Toner Particles 22 to 24

Toner particles 22 to 24 were obtained in the same way as in the production example of Toner particle 1, but modifying herein the production conditions to those given in Table 3.

Toner Particle 25

Toner particle 25 was obtained in the same way as in the production example of Toner particle 1, but modifying herein the shell formation step as given below.

Shell Formation Step

The sample below was weighed in a reaction vessel, and the temperature of the solution was adjusted to 70° C. while under stirring using a propeller stirring blade.

Core particle dispersion 1 333.3 parts

Next, there were added 3.00 parts of the polymerizable monomer 3-(methacryloyloxy)propyltrimethoxysilane used for shell formation, and the whole was stirred at a temperature of 70° C. using a propeller stirring blade. While maintaining stirring, 0.50 parts of potassium persulfate were added all at once, as a polymerization initiator, to the reaction vessel. The temperature of the solution was maintained at 70° C., and the solution was held for 3.0 hours while under mixing using a propeller stirring blade. Next, the pH was adjusted to 8.0 through addition of a 1 mol/L NaOH aqueous solution. Thereafter the interior of the vessel was maintained at 70° C. for 3.0 hours. Then 0.10 parts of methoxytrimethylsilane were added, and the interior of the vessel was stirred at 70° C. for 3.0 hours.

The temperature was lowered to 25° C., and thereafter the pH was adjusted to 1.5 with 1 mol/L hydrochloric acid, with stirring for 1.0 hour, followed by filtration while under washing with ion-exchanged water, to yield Toner particle 25 having a shell.

Production of Toner 1

Herein 100 parts of Toner particle 1, 1.0 part of Silica fine particles 1 and 1.0 part of Organosilicon polymer fine particles 1 were mixed for 5 minutes in a Henschel mixer (by Mitsui Miike Chemical Engineering Machinery Co., Ltd.), whereby Toner 1 was obtained. The jacket temperature of the Henschel mixer was set to 10° C., and the peripheral speed of the rotating blade was set to 38 m/sec.

Production of Toners 2 to 36 and Comparative Toners 1 to 8

The types of toner particle were modified and the types of silica fine particles and organosilicon polymer fine particles were likewise modified, according to Table 4, in the production of the Toner 1. The addition amounts were also modified according to Table 4. Otherwise, Toners 2 to 36 and Comparative toners 1 to 8 were obtained in the same way as in the production of Toner 1.

Table 5 sets out the physical properties of Toner particles 1 to 26, and Table 6 sets out the physical properties of Toners 1 to 36 and Comparative toners 1 to 8. In the shell content measurement, each toner contained a shell with a value corresponding to the addition amount of Table 3.

TABLE 3

| Toner | Core | Polymerizable monomer | | | | |
|---|---|---|---|---|---|---|
| No. particle | dispersion particle | Type 1 | Amount (parts) | Type 2/Type 3 | Amount (parts) | Initiator (parts) |
| 1 | 1 | 3-(methacryloyloxy)propyltris(trimethylsilyloxy)silane | 0.40 | — | — | 0.20 |
| 2 | 1 | 3-(acryloyloxy)propyltris(trimethylsilyloxy)silane | 0.40 | — | — | 0.10 |
| 3 | 1 | 3-(methacryloyloxy)methyltris(trimethylsilyloxy)silane | 0.40 | — | — | 0.50 |
| 4 | 1 | 3-(methacryloyloxy)hexyltris(trimethylsilyloxy)silane | 0.40 | — | — | 0.80 |
| 5 | 1 | 3-(methacryloyloxy)octyltris(trimethylsilyloxy)silane | 0.40 | — | — | 1.00 |
| 6 | 1 | 3-(methacryloyloxy)propyltris(triethylsilyloxy)silane | 0.40 | — | — | 0.50 |
| 7 | 1 | 3-(methacryloyloxy)propyltris(tripropylsilyloxy)silane | 0.40 | — | — | 0.50 |
| 8 | 1 | 3-(methacryloyloxy)propyltris(trimethylsilyloxy)silane | 0.10 | Styrene | 0.23 | 0.10 |
| 9 | 1 | 3-(methacryloyloxy)propyltris(trimethylsilyloxy)silane | 0.40 | Styrene | 0.80 | 0.20 |
| 10 | 1 | 3-(methacryloyloxy)propyltris(trimethylsilyloxy)silane | 0.40 | Styrene | 0.13 | 0.60 |
| 11 | 1 | 3-(methacryloyloxy)propyltris(trimethylsilyloxy)silane | 0.40 | Styrene/methyl methacrylate | 0.1/0.03 | 0.60 |
| 12 | 1 | 3-(methacryloyloxy)propyltris(trimethylsilyloxy)silane | 0.40 | Styrene/acrylic acid | 0.1/0.03 | 0.60 |
| 13 | 1 | 3-(methacryloyloxy)propyltris(trimethylsilyloxy)silane | 0.10 | — | — | 0.10 |
| 14 | 1 | 3-(methacryloyloxy)propyltris(trimethylsilyloxy)silane | 0.30 | — | — | 0.10 |
| 15 | 1 | 3-(methacryloyloxy)propyltris(trimethylsilyloxy)silane | 2.00 | — | — | 0.50 |
| 16 | 1 | 3-(methacryloyloxy)propyltris(trimethylsilyloxy)silane | 4.00 | — | — | 1.00 |
| 17 | 1 | 3-(methacryloyloxy)propyltris(trimethylsilyloxy)silane | 10.00 | — | — | 2.50 |
| 18 | 3 | 3-(methacryloyloxy)propyltris(trimethylsilyloxy)silane | 0.40 | — | — | 0.50 |
| 19 | 2 | 3-(methacryloyloxy)propyltris(trimethylsilyloxy)silane | 0.40 | — | — | 0.50 |
| 20 | 4 | 3-(methacryloyloxy)propyltris(trimethylsilyloxy)silane | 0.40 | — | — | 0.50 |

TABLE 3-continued

| Toner No. particle | Core dispersion particle | Polymerizable monomer Type 1 | Amount (parts) | Type 2/Type 3 | Amount (parts) | Initiator (parts) |
|---|---|---|---|---|---|---|
| 21 | 1 | — | — | — | — | — |
| 22 | 1 | Vinyltriethoxysilane | 0.40 | — | — | 0.50 |
| 23 | 1 | Vinyltrimethoxysilane | 0.40 | — | — | 0.50 |
| 24 | 1 | Allyltrimethylsilane | 0.40 | — | — | 0.50 |
| 25 | | Described in the production method of Toner particle 25 | | | | |
| 26 | 1 | 3-(methacryloyloxy)propyltris(trimethylsilyloxy)silane | 0.08 | — | — | 0.10 |

In Table 3, the numbers separated by a slash in the column of the types of polymerizable monomer indicate that both polymerizable monomer types were used. Numerical values separated by a slash in the amount column indicate the respective input amounts.

TABLE 4

| | Toner particle No. | Silica fine particles No. | Addition amount (parts) | Organosilicon polymer fine particle No. | Addition amount (parts) |
|---|---|---|---|---|---|
| Toner 1 | 1 | 1 | 1.0 | 1 | 1.0 |
| Toner 2 | 2 | 1 | 1.0 | 1 | 1.0 |
| Toner 3 | 3 | 1 | 1.0 | 1 | 1.0 |
| Toner 4 | 4 | 1 | 1.0 | 1 | 1.0 |
| Toner 5 | 5 | 1 | 1.0 | 1 | 1.0 |
| Toner 6 | 6 | 1 | 1.0 | 1 | 1.0 |
| Toner 7 | 7 | 1 | 1.0 | 1 | 1.0 |
| Toner 8 | 1 | 4 | 0.1 | 1 | 1.0 |
| Toner 9 | 1 | 2 | 1.0 | — | — |
| Toner 10 | 1 | 1 | 1.0 | — | — |
| Toner 11 | 1 | 3 | 1.0 | — | — |
| Toner 12 | 1 | 1 | 0.1 | — | — |
| Toner 13 | 1 | 1 | 0.5 | — | — |
| Toner 14 | 1 | 1 | 2.0 | — | — |
| Toner 15 | 1 | 1 | 6.0 | — | — |
| Toner 16 | 1 | — | — | 2 | 1.0 |
| Toner 17 | 1 | — | — | 1 | 1.0 |
| Toner 18 | 1 | — | — | 3 | 1.0 |
| Toner 19 | 1 | — | — | 1 | 0.1 |
| Toner 20 | 1 | — | — | 1 | 0.5 |
| Toner 21 | 1 | — | — | 1 | 2.0 |
| Toner 22 | 1 | — | — | 1 | 6.0 |
| Toner 23 | 8 | 1 | 1.0 | 1 | 1.0 |
| Toner 24 | 9 | 1 | 1.0 | 1 | 1.0 |
| Toner 25 | 10 | 1 | 1.0 | 1 | 1.0 |
| Toner 26 | 11 | 1 | 1.0 | 1 | 1.0 |
| Toner 27 | 12 | 1 | 1.0 | 1 | 1.0 |
| Toner 28 | 13 | 1 | 1.0 | 1 | 1.0 |
| Toner 29 | 14 | 1 | 1.0 | 1 | 1.0 |
| Toner 30 | 15 | 1 | 1.0 | 1 | 1.0 |
| Toner 31 | 16 | 1 | 1.0 | 1 | 1.0 |
| Toner 32 | 17 | 1 | 1.0 | 1 | 1.0 |
| Toner 33 | 18 | 1 | 1.0 | 1 | 1.0 |
| Toner 34 | 19 | 1 | 1.0 | 1 | 1.0 |
| Toner 35 | 20 | 1 | 1.0 | 1 | 1.0 |
| Toner 36 | 26 | 1 | 1.0 | 1 | 1.0 |
| Comparative toner 1 | 21 | 1 | 1.0 | 1 | 1.0 |
| Comparative toner 2 | 22 | 1 | 1.0 | 1 | 1.0 |
| Comparative toner 3 | 23 | 1 | 1.0 | 1 | 1.0 |
| Comparative toner 4 | 24 | 1 | 1.0 | 1 | 1.0 |
| Comparative toner 5 | 25 | 1 | 1.0 | 1 | 1.0 |

TABLE 4-continued

| | Toner particle No. | Silica fine particles No. | Addition amount (parts) | Organosilicon polymer fine particle No. | Addition amount (parts) |
|---|---|---|---|---|---|
| Comparative toner 6 | 1 | 4 | 1.0 | — | — |
| Comparative toner 7 | 1 | 5 | 1.0 | — | — |
| Comparative toner 8 | 1 | 1 | 0.02 | — | — |

TABLE 5

| | Monomer units represented by Formula (1) | Shell coverage ratio (%) | (I) Monomer unit content (mass %) | Mw of Polymer in shell |
|---|---|---|---|---|
| Toner particle 1 | Y | 95% | 100 | 48000 |
| Toner particle 2 | Y | 96% | 100 | 97000 |
| Toner particle 3 | Y | 94% | 100 | 19400 |
| Toner particle 4 | Y | 94% | 100 | 11900 |
| Toner particle 5 | Y | 94% | 100 | 9100 |
| Toner particle 6 | Y | 92% | 100 | 19000 |
| Toner particle 7 | Y | 89% | 100 | 19000 |
| Toner particle 8 | Y | 72% | 30 | 9800 |
| Toner particle 9 | Y | 85% | 50 | 32000 |
| Toner particle 10 | Y | 91% | 75 | 16000 |
| Toner particle 11 | Y | 89% | 75 | 16000 |
| Toner particle 12 | Y | 88% | 75 | 97000 |
| Toner particle 13 | Y | 82% | 100 | 24000 |
| Toner particle 14 | Y | 89% | 100 | 73000 |
| Toner particle 15 | Y | 92% | 100 | 98000 |
| Toner particle 16 | Y | 95% | 100 | 99000 |
| Toner particle 17 | Y | 96% | 100 | 101000 |
| Toner particle 18 | Y | 95% | 100 | 19400 |
| Toner particle 19 | Y | 94% | 100 | 19400 |
| Toner particle 20 | Y | 93% | 100 | 19000 |
| Toner particle 21 | N | 0% | 0 | — |
| Toner particle 22 | N | 98% | 0 | 19000 |
| Toner particle 23 | N | 98% | 0 | 19200 |
| Toner particle 24 | N | 96% | 0 | 19000 |
| Toner particle 25 | N | 94% | 0 | 102000 |
| Toner particle 26 | Y | 63% | 100 | 20300 |

In Table 5, the column of the monomer units represented by Formula (I) is marked Y when the polymer in the shell contains the monomer units represented by Structural formula (I), and is marked with N when the polymer does not contain those monomer units. The notation “(I) Monomer unit content” denotes the content ratio of the monomer units represented by Formula (I), from among the monomer units included in the polymer of the shell.

TABLE 6

| | External additive A | | Proportion relative to total external additive | | |
|---|---|---|---|---|---|
| | Coverage ratio | Number-average particle diameter (nm) of particles with particle diameter in range from 30 to 300 nm | Particle diameter from 30 to 300 nm (number %) | Particle diameter smaller than 30 nm (number %) | Particle diameter greater than 300 nm (number %) |
| Toner 1 | 8.1% | 95 | 100 | 0 | 0 |
| Toner 2 | 7.9% | 95 | 100 | 0 | 0 |
| Toner 3 | 8.5% | 95 | 100 | 0 | 0 |
| Toner 4 | 7.1% | 95 | 100 | 0 | 0 |
| Toner 5 | 7.8% | 95 | 100 | 0 | 0 |
| Toner 6 | 8.4% | 95 | 100 | 0 | 0 |
| Toner? | 8.2% | 95 | 100 | 0 | 0 |
| Toner 8 | 3.8% | 90 | 90 | 10 | 0 |
| Toner 9 | 7.2% | 50 | 100 | 0 | 0 |
| Toner 10 | 4.0% | 100 | 100 | 0 | 0 |
| Toner 11 | 2.2% | 200 | 100 | 0 | 0 |
| Toner 12 | 0.3% | 100 | 100 | 0 | 0 |
| Toner 13 | 1.8% | 100 | 100 | 0 | 0 |
| Toner 14 | 8.1% | 100 | 100 | 0 | 0 |
| Toner 15 | 27.0% | 100 | 100 | 0 | 0 |
| Toner 16 | 6.9% | 50 | 100 | 0 | 0 |
| Toner 17 | 3.6% | 90 | 100 | 0 | 0 |
| Toner 18 | 2.2% | 200 | 100 | 0 | 0 |
| Toner 19 | 0.6% | 90 | 100 | 0 | 0 |
| Toner 20 | 2.2% | 90 | 100 | 0 | 0 |
| Toner 21 | 8.0% | 90 | 100 | 0 | 0 |
| Toner 22 | 20.2% | 90 | 100 | 0 | 0 |
| Toner 23 | 8.3% | 95 | 100 | 0 | 0 |
| Toner 24 | 8.2% | 95 | 100 | 0 | 0 |
| Toner 25 | 7.7% | 95 | 100 | 0 | 0 |
| Toner 26 | 7.6% | 95 | 100 | 0 | 0 |
| Toner 27 | 8.1% | 95 | 100 | 0 | 0 |
| Toner 28 | 8.3% | 95 | 100 | 0 | 0 |
| Toner 29 | 7.6% | 95 | 100 | 0 | 0 |
| Toner 30 | 8.1% | 95 | 100 | 0 | 0 |
| Toner 31 | 8.3% | 95 | 100 | 0 | 0 |
| Toner 32 | 7.5% | 95 | 100 | 0 | 0 |
| Toner 33 | 8.1% | 95 | 100 | 0 | 0 |
| Toner 34 | 8.4% | 95 | 100 | 0 | 0 |
| Toner 35 | 7.5% | 95 | 100 | 0 | 0 |
| Toner 36 | 7.9% | 95 | 100 | 0 | 0 |
| Comparative toner 1 | 7.7% | 95 | 100 | 0 | 0 |
| Comparative toner 2 | 7.9% | 95 | 100 | 0 | 0 |
| Comparative toner 3 | 8.1% | 95 | 100 | 0 | 0 |
| Comparative toner 4 | 7.5% | 95 | 100 | 0 | 0 |
| Comparative toner 5 | 7.8% | 95 | 100 | 0 | 0 |
| Comparative toner 6 | 33.6% (*1) | — | 0 | 100 | 0 |
| Comparative toner 7 | 0.5% (*1) | — | 0 | 0 | 100 |
| Comparative toner 8 | 0.1% | 100 | 100 | 0 | 0 |

In Table 6, the coverage ratios marked as *1 are coverage ratios of particles not contained as the external additive A.

Examples 1 to 36, Comparative Examples 1 to 8

Evaluations were performed using the above Toners 1 to 36 and Comparative toners 1 to 8. Evaluation results are given in Table 7. The evaluation methods and evaluation criteria are explained below.

Evaluation of Image Streaks After a Durability Test

Image streaks, which are vertical streaks having a width of about 0.1 to 0.5 mm, are image defects readily observed when a whole-surface halftone image is outputted. A modified machine of LBP712Ci (by Canon Inc.) was used as an image forming apparatus. The process speed of the main body was modified to 270 mm/sec. Also, necessary adjustments were made so that image formation was possible under these conditions. Further, toner was removed from the cyan cartridge, which was then filled with 100 g of the evaluation toner instead.

Image streaks at the time of use in a normal-temperature, normal-humidity environment (23° C., 60% RH) were evaluated. The evaluation paper used was XEROX4200 paper (75 g/$m^2$ by XEROX Corporation). In a normal-temperature, normal-humidity environment there were outputted 15,000 prints intermittently, with 2 prints of a text image having a print percentage of 0.5% being outputted every 4 seconds, then the 50% halftone image was output over the whole-surface and the presence of streaks was observed. Image streaks (durability test streaks) after the durability test served herein as the evaluation result. The evaluation results are given in Table 7.

Evaluation Criteria

A: no streaks occur.
B: no streaks appear on the image, but 1 to 2 streaks are visible on the developing roller.
C: one streak on the image.
D: two streaks on the image.
E: three or more streaks on the image.

Evaluation of Defective Regulation

A modified LBP712Ci machine (by Canon Inc.) was used as the image forming apparatus. The process speed of the main body was modified to 270 mm/sec. Also, the necessary adjustments were made so that image formation was possible under these conditions. Further, toner was removed from the cyan cartridge, which was then filled with 100 g of the evaluation toner instead.

To evaluate defective regulation, the state of a toner coat on the developing roller surface after output of 15000 prints in a low-temperature, low-humidity environment (15° C., 10% RH) was observed, and the occurrence or absence of coating defects caused by excess charging of the toner was observed visually in accordance with the criteria below. The image in the durability test were horizontal lines with a print percentage of 0.5%, with two prints outputted intermittently every 4 seconds, to a total of 15000 prints, after which a 50% halftone image on the entire surface was outputted and checked.

A: no coating defects observed on the developing roller.
B: slight coating defects present on the developing roller, but not appearing on the image.
C: distinctive coating defects on the developing roller, but not appearing on the image.
D: coating defects on the developing roller, with observable image defects derived from the coating defects.

Evaluation of Low-Temperature Fixability

A color laser printer LBP712Ci (by Canon Inc.) with the fixing unit removed was prepared, toner was taken out from the cyan cartridge, and the toner to be evaluated was filled in instead. Color laser copier paper (by Canon, 80 g/$m^2$) was used as the recording medium. Next, an unfixed image 2.0 cm long and 15.0 cm wide was formed using the toner having been filled in so that the toner laid-on level was 0.20 mg/$cm^2$, at a portion 1.0 cm from the upper end in the paper passage direction. Next, the removed fixing unit was altered so as to allow regulating the fixation temperature and the process speed, and a fixing test of the unfixed image was carried using the modified fixing unit.

Firstly, the process speed was set to 270 mm/s, the fixing line pressure was set to 27.4 kgf, in a normal-temperature, normal-humidity environment (23° C., 60% RH), and then the set temperature was gradually raised at increments of 5° C., from an initial temperature of 140° C., while at the same time the unfixed image was fixed at each respective temperature.

The evaluation criteria for low-temperature fixability are as follows. A low-temperature-side fixing starting point denotes herein a lowest temperature at which the rate of decrease of image density before and after rubbing of the surface of the image over 5 rubs using a lens-cleaning paper (Dusper K-3) applied with a load of 4.9 kPa (50 g/$cm^2$) at a speed of 0.2 m/second, is 10.0% or lower. The rate of decrease of image density tends to increase in a case where fixing is not performed properly. Image density was measured using a series 500 spectrodensitometer, by X-Rite Inc.).

Evaluation Criteria

A: low-temperature-side fixing starting point 145° C. or lower.
B: low-temperature-side fixing starting point of 150° C.
C: low-temperature-side fixing starting point of 155° C.
D: low-temperature-side fixing starting point of 160° C. or higher.

TABLE 7

| | Evaluation toner | Durability streaks | Defective regulation | Fixability: Low-temperature-side fixing starting point | Fixability: Rank |
|---|---|---|---|---|---|
| Example 1 | Toner 1 | A | A | 140° C. | A |
| Example 2 | Toner 2 | A | A | 140° C. | A |
| Example 3 | Toner 3 | A | A | 140° C. | A |
| Example 4 | Toner 4 | B | A | 140° C. | A |
| Example 5 | Toner 5 | B | A | 140° C. | A |
| Example 6 | Toner 6 | A | A | 140° C. | A |
| Example 7 | Toner 7 | A | A | 140° C. | A |
| Example 8 | Toner 8 | A | A | 140° C. | A |
| Example 9 | Toner 9 | A | A | 140° C. | A |
| Example 10 | Toner 10 | A | A | 140° C. | A |
| Example 11 | Toner 11 | A | A | 140° C. | A |
| Example 12 | Toner 12 | A | B | 140° C. | A |
| Example 13 | Toner 13 | A | A | 140° C. | A |
| Example 14 | Toner 14 | A | A | 145° C. | A |
| Example 15 | Toner 15 | B | B | 140° C. | A |
| Example 16 | Toner 16 | B | A | 140° C. | A |
| Example 17 | Toner 17 | B | A | 140° C. | A |
| Example 18 | Toner 18 | B | A | 140° C. | A |
| Example 19 | Toner 19 | B | B | 140° C. | A |
| Example 20 | Toner 20 | B | A | 140° C. | A |
| Example 21 | Toner 21 | B | A | 145° C. | A |

TABLE 7-continued

| | Evaluation toner | Durability streaks | Defective regulation | Fixability: Low-temperature-side fixing starting point | Fixability: Rank |
|---|---|---|---|---|---|
| Example 22 | Toner 22 | B | B | 150° C. | B |
| Example 23 | Toner 23 | C | C | 145° C. | A |
| Example 24 | Toner 24 | B | A | 140° C. | A |
| Example 25 | Toner 25 | A | A | 140° C. | A |
| Example 26 | Toner 26 | A | A | 140° C. | A |
| Example 27 | Toner 27 | A | A | 145° C. | A |
| Example 28 | Toner 28 | C | A | 140° C. | A |
| Example 29 | Toner 29 | A | A | 140° C. | A |
| Example 30 | Toner 30 | A | A | 145° C. | A |
| Example 31 | Toner 31 | A | A | 150° C. | B |
| Example 32 | Toner 32 | A | A | 155° C. | C |
| Example 33 | Toner 33 | C | B | 140° C. | A |
| Example 34 | Toner 34 | A | A | 140° C. | A |
| Example 35 | Toner 35 | B | A | 150° C. | B |
| Example 36 | Toner 36 | C | C | 140° C. | A |
| Comparative exampe 1 | Comparative toner 1 | E | C | 140° C. | A |
| Comparative exampe 2 | Comparative toner 2 | D | A | 155° C. | C |
| Comparative exampe 3 | Comparative toner 3 | D | A | 155° C. | C |
| Comparative exampe 4 | Comparative toner 4 | D | A | 155° C. | C |
| Comparative exampe 5 | Comparative toner 5 | D | A | 155° C. | C |
| Comparative exampe 6 | Comparative toner 6 | D | D | 145° C. | A |
| Comparative exampe 7 | Comparative toner 7 | D | D | 140° C. | A |
| Comparative exampe 8 | Comparative toner 8 | D | D | 140° C. | A |

This disclosure relates to following constitutions.

Constitution 1

A toner, comprising a toner particle, wherein the toner particle has a core-shell structure comprising a core particle and a shell on a surface of the core particle, the shell comprises a polymer having monomer units represented by Formula (I) below, the toner comprises an external additive A having a particle diameter of 30 to 300 nm, the external additive A is at least one selected from a group consisting of silica fine particles and organosilicon polymer fine particles, and a ratio of coverage of a surface of the toner particle with the external additive A is 0.3 area % or higher:

(I)

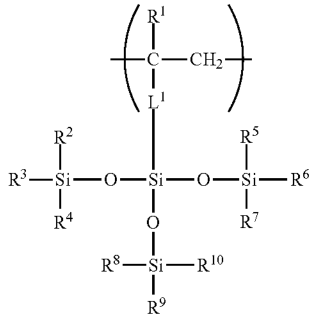

in Formula (I), $L^1$ represents $—COO(CH_2)_n—$ (where n is an integer of 1 to 10), and carbonyl of $L^1$ is bonded to a carbon atom of a main chain; $R^1$ represents hydrogen or a methyl group; and $R^2$ to $R^{10}$ represent each independently an alkyl group having 1 to 4 carbon atoms.

Constitution 2

The toner according to constitution 1, wherein a content ratio of the monomer units represented by Formula (I) in the polymer is 50 mass % or higher.

Constitution 3

The toner according to constitution 1 or 2, wherein a ratio of coverage of the surface of the core particle with the shell is 80 area % or higher, in a backscattered electron image of the toner particle captured at 10,000 magnifications using a scanning electron microscope.

Constitution 4

The toner according to any one of constitutions 1 to 3, wherein a content of the shell is 0.10 to 4.00 parts by mass, relative to 100 parts by mass of the core particle.

Constitution 5

The toner according to any one of constitutions 1 to 4, wherein the core particle comprises a binder resin, and the binder resin comprises a vinyl resin.

Constitution 6

The toner according to any one of constitutions 1 to 5, wherein the external additive A comprises the silica fine particles.

Constitution 7

The toner according to any one of constitutions 1 to 6, wherein the external additive A comprises the silica fine particles and the organosilicon polymer fine particles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-102554, filed Jun. 21, 2021, and Japanese Patent Application No. 2022-078276, filed May 11, 2022, which are hereby incorporated by reference herein in their entirety.

What is claimed is:

1. A toner, comprising a toner particle, wherein the toner particle has a core-shell structure comprising a core particle and a shell on a surface of the core particle, the shell comprises a polymer having monomer units represented by Formula (I) below, the toner comprises an external additive A having a particle diameter of 30 to 300 nm, the external additive A is at least one selected from the group consisting of silica fine particles and organosilicon polymer fine particles, and a ratio of coverage of a surface of the toner particle with the external additive A is 0.3 area % or higher:

(I)

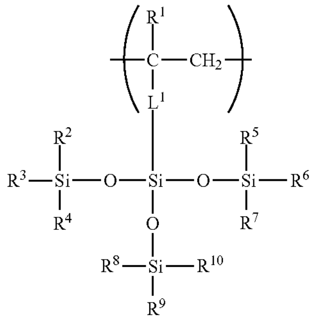

in Formula (I), $L^1$ represents $—COO(CH_2)_n—$ (where n is an integer of 1 to 10), and carbonyl of $L^1$ is bonded to a carbon atom of a main chain; $R^1$ represents hydrogen or a methyl group; and $R^2$ to $R^{10}$ represent each independently an alkyl group having 1 to 4 carbon atoms.

2. The toner according to claim 1, wherein a content ratio of the monomer units represented by Formula (I) in the polymer is 50 mass % or higher.

3. The toner according to claim 1, wherein a ratio of coverage of the surface of the core particle with the shell is 80 area % or higher, in a backscattered electron image of the toner particle captured at 10,000 magnifications using a scanning electron microscope.

4. The toner according to claim 1, wherein a content of the shell is 0.10 to 4.00 parts by mass, relative to 100 parts by mass of the core particle.

5. The toner according to claim 1, wherein the core particle comprises a binder resin, and the binder resin comprises a vinyl resin.

6. The toner according to claim 1, wherein the external additive A comprises the silica fine particles.

7. The toner according to claim 1, wherein the external additive A comprises the silica fine particles and the organosilicon polymer fine particles.

* * * * *